(12) United States Patent
Frazier et al.

(10) Patent No.: US 8,459,314 B2
(45) Date of Patent: Jun. 11, 2013

(54) BATTERY SPILL CONTAINMENT TRAYS, BATTERY SPILL CONTAINMENT SYSTEMS, AND METHODS OF BATTERY SPILL CONTAINMENT

(75) Inventors: Douglas Frazier, Claremont, CA (US); Chet Mallory, Reno, NV (US)

(73) Assignee: Expo Power Systems, Inc., Montclair, CA (US)

( * ) Notice: Subject to any disclaimer, the term of this patent is extended or adjusted under 35 U.S.C. 154(b) by 429 days.

(21) Appl. No.: 12/783,526

(22) Filed: May 19, 2010

(65) Prior Publication Data
US 2010/0294721 A1 Nov. 25, 2010

Related U.S. Application Data

(60) Provisional application No. 61/179,695, filed on May 19, 2009, provisional application No. 61/184,740, filed on Jun. 5, 2009.

(51) Int. Cl.
*B65B 1/04* (2006.01)
*H01M 2/10* (2006.01)
*F16K 23/00* (2006.01)
*B65D 1/34* (2006.01)

(52) U.S. Cl.
USPC .............. 141/86; 429/100; 137/313; 220/571

(58) Field of Classification Search
None
See application file for complete search history.

(56) References Cited

U.S. PATENT DOCUMENTS

| | | |
|---|---|---|
| 1,898,297 A | 2/1933 | Fox |
| 2,173,736 A | 9/1939 | Thomas |
| 2,969,863 A | 1/1961 | Woldring et al. |
| 3,757,990 A | 9/1973 | Buth |
| 3,938,666 A | 2/1976 | Castleberry |
| 3,952,907 A | 4/1976 | Ogden et al. |
| 4,270,661 A | 6/1981 | Rosenband |
| 4,348,466 A | 9/1982 | Elehew et al. |
| 4,552,166 A | 11/1985 | Chadbourne, Sr. et al. |
| 4,763,796 A | 8/1988 | Flum |
| 4,765,775 A | 8/1988 | Kroger |
| 4,790,707 A | 12/1988 | Magretta et al. |
| 4,947,888 A | 8/1990 | Tanner |
| 5,090,588 A | 2/1992 | Van Romer et al. |
| 5,096,087 A | 3/1992 | Thomas |
| 5,140,744 A | 8/1992 | Miller |
| 5,160,025 A | 11/1992 | Greenawald |
| 5,160,051 A | 11/1992 | Bustos |
| 5,295,591 A | 3/1994 | Slater |

(Continued)

OTHER PUBLICATIONS

International Search Report and Written Opinion of the International Searching Authority dated Feb. 7, 2011, for International Application No. PCT/US2010/035489, filed May 19, 2010.

(Continued)

*Primary Examiner* — Ula C Ruddock
*Assistant Examiner* — Matthew Van Oudenaren
(74) *Attorney, Agent, or Firm* — Christie, Parker & Hale, LLP

(57) ABSTRACT

Battery spill containment trays, battery spill containment systems, and methods of battery spill containment are provided. A spill containment system includes a tray mountable on a rack and including a support surface for supporting a device thereon; and an absorbent member removably installed on the tray below the support surface and configured to absorb a spilled substance of the device.

32 Claims, 22 Drawing Sheets

U.S. PATENT DOCUMENTS

| | | |
|---|---|---|
| 5,304,434 A | 4/1994 | Stone |
| 5,316,035 A | 5/1994 | Collins et al. |
| 5,316,175 A | 5/1994 | Van Romer |
| 5,399,445 A | 3/1995 | Tinker |
| 5,454,195 A | 10/1995 | Hallsten |
| 5,464,492 A | 11/1995 | Gregory et al. |
| 5,490,600 A | 2/1996 | Bustos |
| 5,492,158 A | 2/1996 | Haag |
| 5,549,178 A | 8/1996 | Yuhas |
| 5,555,907 A | 9/1996 | Philipp |
| 5,593,048 A | 1/1997 | Johnson |
| 5,704,476 A | 1/1998 | Abbott |
| 5,722,551 A | 3/1998 | Cocciemiglio, Jr. |
| 5,775,869 A | 7/1998 | Bishop |
| 5,865,323 A | 2/1999 | Lecroy |
| 5,882,142 A | 3/1999 | Siglin et al. |
| 5,948,250 A | 9/1999 | Middleton |
| 5,975,332 A | 11/1999 | Bishop |
| 6,102,073 A | 8/2000 | Williams |
| 6,308,728 B1 | 10/2001 | Frazier |
| 6,395,417 B1 | 5/2002 | Frazier |
| 6,401,946 B1 * | 6/2002 | Chalasani et al. ............ 211/188 |
| 6,901,946 B2 | 6/2005 | Frazier |
| 7,124,771 B2 * | 10/2006 | Frazier ......................... 137/312 |

OTHER PUBLICATIONS

Invitation to Pay Additional Fees and, Where Applicable, Protest Fee mailed Sep. 21, 2010, for International Application No. PCT/US2010/035489, filed May 19, 2010.

* cited by examiner

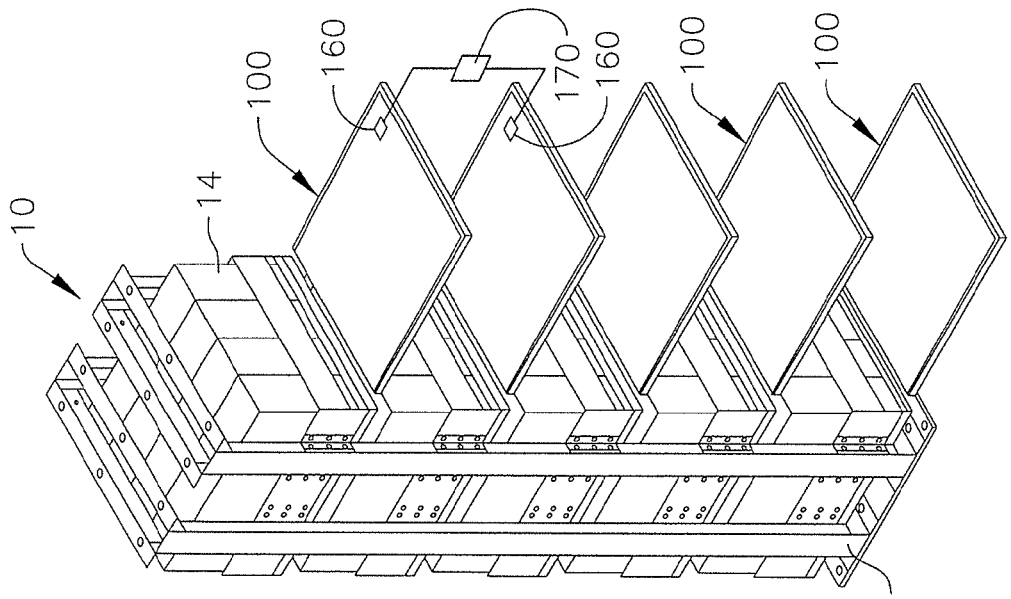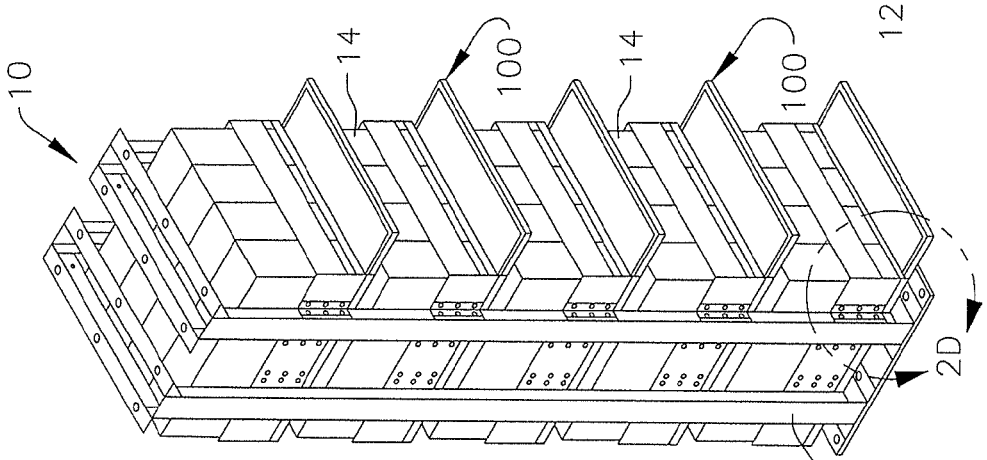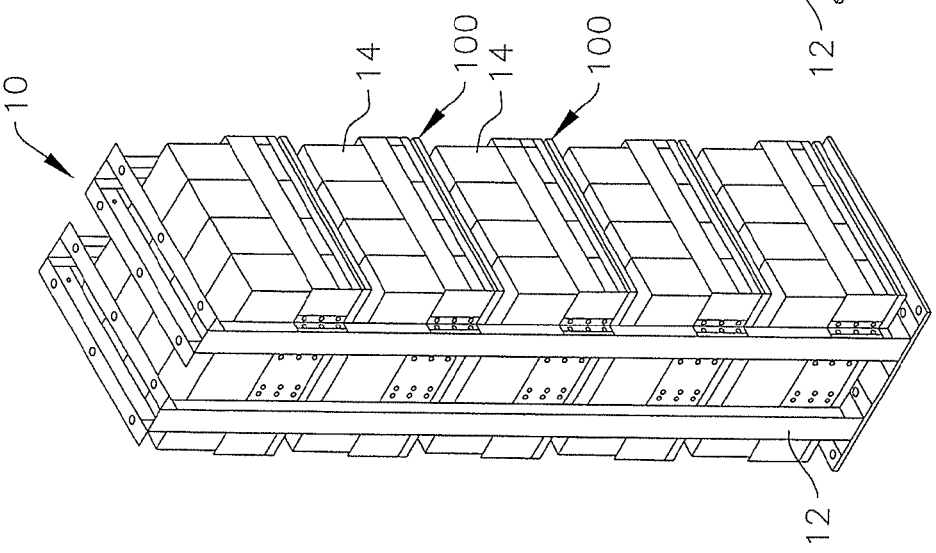

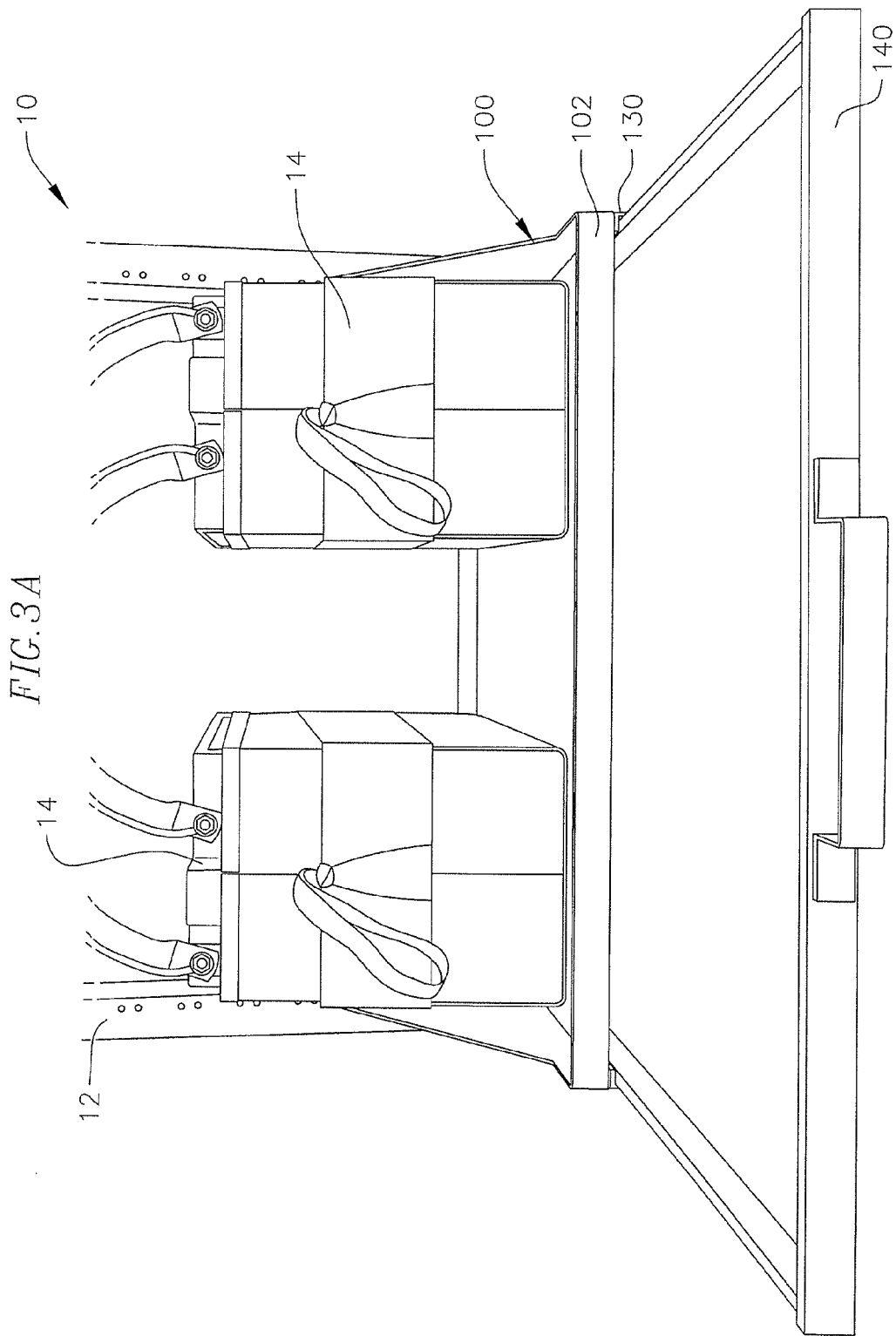

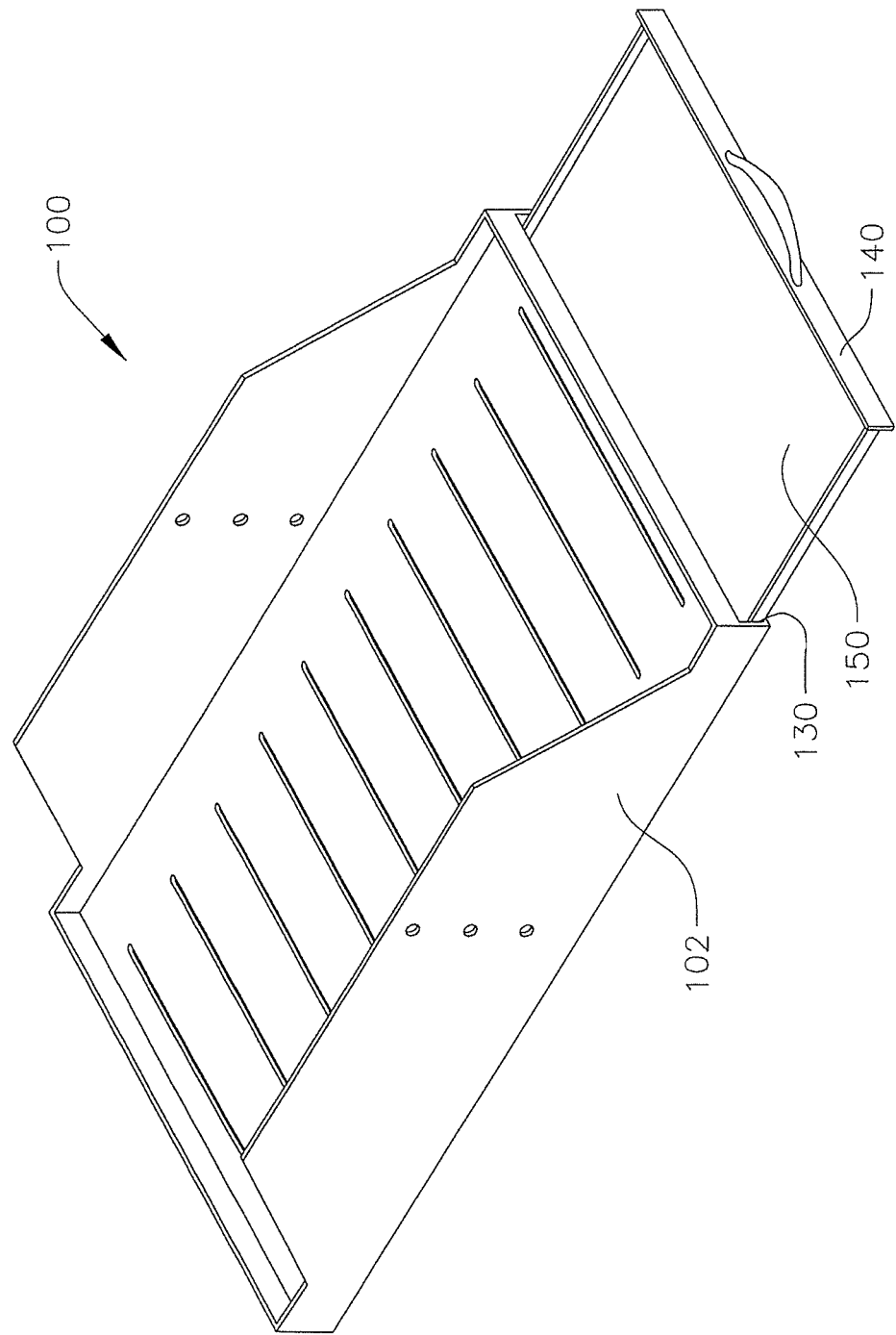

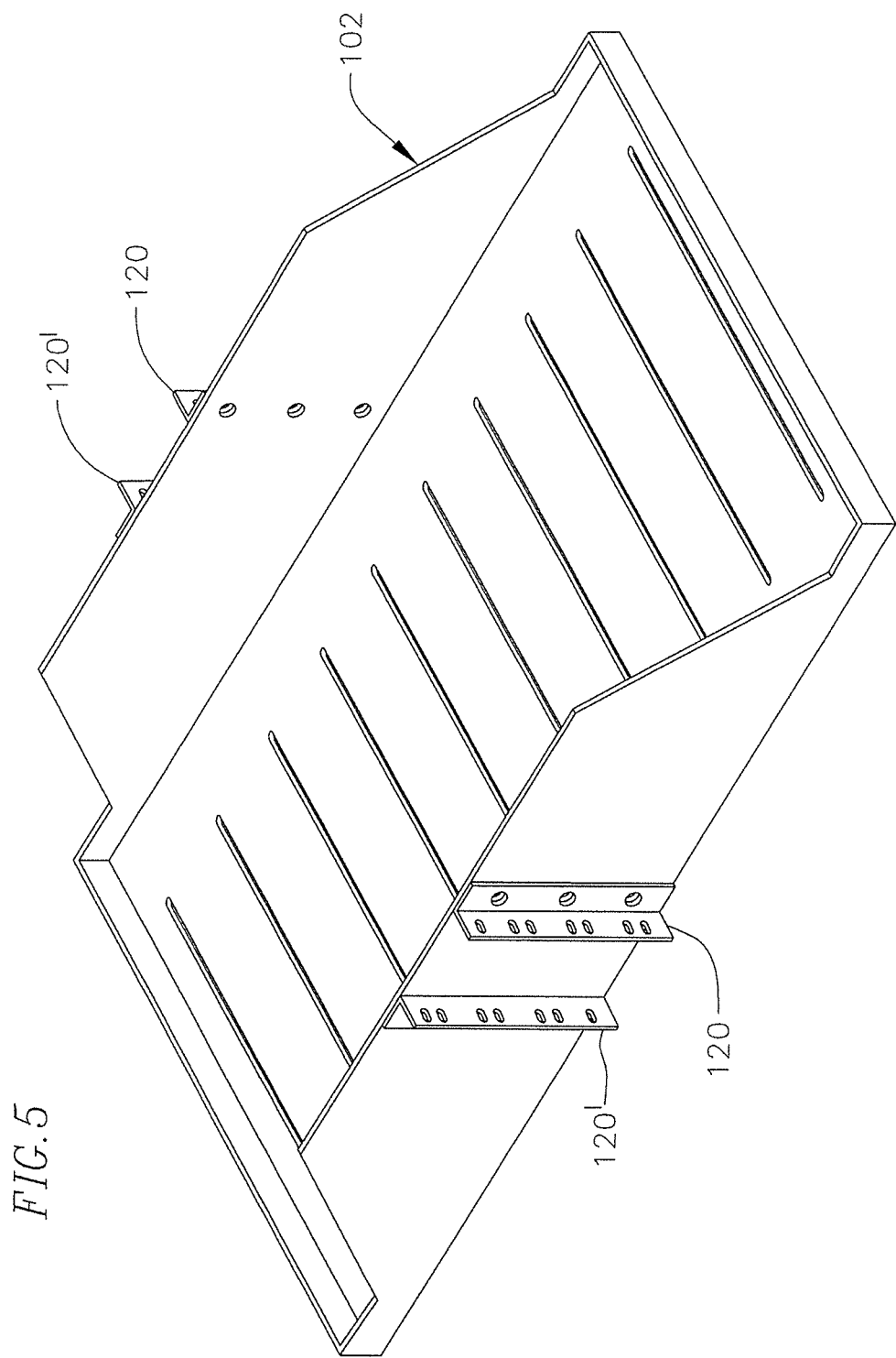

BATTERY SPILL CONTAINMENT TRAYS, BATTERY SPILL CONTAINMENT SYSTEMS, AND METHODS OF BATTERY SPILL CONTAINMENT

CROSS-REFERENCE TO RELATED APPLICATIONS

This application claims priority to and the benefit of U.S. Provisional Patent Application No. 61/179,695, filed on May 19, 2009, and U.S. Provisional Patent Application No. 61/184,740, filed on Jun. 5, 2009, the entire content of each of which is incorporated herein by reference.

FIELD OF THE INVENTION

The present invention relates generally to battery spill containment systems and methods for containing hazardous substance spills from batteries, and more particularly to trays for supporting the batteries and associated absorbent members for containing spills from the batteries.

BACKGROUND

In our industrial society, devices often contain substances that may leak or spill undesirably onto other devices, persons, or the surrounding environment. For example, batteries may be stored on battery racks, cabinets, relays racks, or a combination of the above or other structures, where the batteries may serve as a backup power supply for data communication centers, telecommunication equipment, broadband, cable, and/or computers. These batteries may contain acidic or alkaline substances that may leak or spill onto other batteries, cables, equipment, and/or other devices, as well as personnel, thereby posing a hazard to people and property. Sulfuric acid, commonly found in batteries, is an extremely hazardous material regulated by federal, state, and local governments. For example, with respect to batteries, Article 64 of the Uniform Fire Code requires a four-inch high containment barrier with an acid neutralization capability to a pH of between 7.0 and 9.0. Many valve regulated lead acid (VRLA) batteries, as well as other batteries and devices other than batteries, are required to have spill containment or control devices required by local city or county ordinances.

As such, it is desirable to contain leaks and spills from hazardous devices such as batteries. While some spill containment systems exist, existing systems have shortcomings and are even cost-prohibitive in many cases. Storage space for battery backup systems is precious, and as companies become increasingly dependent on computers, their need for storing a greater number of batteries increases. Both real estate, battery cabinets, and relay rack space are at a premium. Thus, companies utilizing battery backup systems need to store as many batteries as possible in a given amount of space, such as in a warehouse, a basement, or other rooms. Often, the rooms may have structures that obstruct the floor space (such as columns); others may have non-rectangular areas, reducing the amount of space available for spill containment systems. However, existing spill containment systems typically are not configured to maximize space. Moreover, existing spill containment systems are typically placed beneath an entire rack or cabinet of batteries and, as such, do not identify a source of spillage.

Therefore, it is desirable to have improved systems and methods for battery spill containment.

SUMMARY

Aspects of embodiments of the present invention are directed to battery spill containment systems configured to be installed in diverse areas and maximize usage of available space, permitting, for example, a greater number of batteries to be stored in a given space. Additionally, battery spill containment systems according to embodiments of the present invention are adapted to be installed quickly and easily in a given space at a low cost, and with minimal effort and time. Further aspects of embodiments of the present invention are directed to battery spill containment trays and systems providing ease of access to the batteries, increased safety, and modularity of design incorporating spill containment into a shelf assembly to reduce cost and space requirements. Spill containment systems according to embodiments of the present invention may further be utilized for devices other than batteries, including, but not limited to, air conditioning units that may drip water from condensation or leak Freon, or water heaters that may leak water.

According to one embodiment of the present invention, a battery spill containment system includes a battery tray bolted or welded to a relay rack, open frame, or battery shelf for supporting the batteries and providing spill containment and/or neutralization directly beneath the batteries, taking less than one rack space known as a "rack U." The spill containment system includes a pan beneath the battery tray for accepting a slide-out, liquid-tight drawer containing an absorbent and/or neutralizing pad.

According to another embodiment of the present invention, a battery spill containment system includes an absorbent and/or neutralizing pad or cartridge that is slidable directly into and out of the pan beneath the battery tray without a drawer. The pad or cartridge may be disposable and/or flame resistant.

According to another embodiment of the present invention, a battery spill containment system includes a battery tray assembly including a plurality of bridge elements, or rails, resting on a battery tray and supporting and raising the batteries to provide for drainage of a spill or leak onto absorbent and/or neutralizing pads supported beneath the battery tray.

According to still another embodiment of the present invention, a battery spill containment system includes a battery spill containment drawer having an absorbent pad therein for installing under a battery stack, such as a 20-year VRLA battery stack.

According to an embodiment of the present invention, a spill containment system includes a tray mountable on a rack and including a support surface for supporting a device thereon; and an absorbent member removably installed on the tray below the support surface and configured to absorb a spilled substance of the device.

In one embodiment, the support surface has at least one opening for allowing the spilled substance to pass therethrough onto the absorbent member. The tray may further include a pan below the support surface and having a cavity configured to receive the absorbent member therein. The tray may further include a drawer removably slidable into the cavity of the pan and having a recess for receiving the absorbent member therein.

In one embodiment, a spill containment system further includes another tray mountable on the rack and including a support surface for supporting another device thereon; and another absorbent member removably installed on the another tray below the support surface of the another tray and configured to absorb a spilled substance of the another device.

The absorbent member may be configured to neutralize the spilled substance. The device may include a battery.

In one embodiment, the tray includes a bridge assembly configured to support the battery above a base portion of the tray, the bridge assembly defining the support surface. The bridge assembly may include a plurality of bridge members arranged adjacent one another on the base portion. The bridge assembly may have at least one opening for allowing the spilled substance to pass therethrough onto the absorbent member. The absorbent member may be removably slidable into a cavity formed between the support surface and the base portion.

In one embodiment, a spill containment system further includes a sensor adapted to detect a variation of at least one of moisture and pH in the absorbent member. A spill containment system may further include an alarm connected to the sensor and adapted to report the variation of the at least one of moisture and pH.

According to another embodiment of the present invention, a battery rack assembly includes a rack; a plurality of batteries supported on the rack; a drawer removably slidable between base members of the rack below the plurality of batteries, the drawer having a recess; and at least one absorbent member in the recess of the drawer and configured to contain a spilled substance of at least one battery of the plurality of batteries.

According to another embodiment of the present invention, a battery rack assembly includes a rack; a plurality of batteries supported on the rack; a plurality of trays mounted on the rack, each of the trays including a support surface supporting a battery of the plurality of batteries thereon; and at least one absorbent member removably installed in the battery rack assembly below at least one battery of the plurality of batteries and configured to contain a spilled substance of the at least one battery, wherein each of the trays has an absorbent member of the at least one absorbent member removably installed thereon below the battery for containing a spilled substance of the battery. The battery rack assembly may further include a plurality of sensors, each adapted to detect a variation of at least one of moisture and pH in the absorbent member installed on a respective one of the trays.

According to another embodiment of the present invention, a spill containment tray mountable on a rack includes a support surface for supporting a device thereon, the tray having a cavity below the support surface for receiving an absorbent member configured to absorb a spilled substance of the device therein, the support surface having at least one opening for allowing the spilled substance to pass therethrough onto the absorbent member. The spill containment tray may further include a plurality of bridge members arranged adjacent one another, wherein the bridge members define the support surface, and the cavity extends across the adjacent bridge members.

According to another embodiment of the present invention, a method of containing a spilled substance of a battery includes mounting a tray on a rack assembly; supporting the battery on a support surface of the tray; and removably installing an absorbent member on the tray below the battery.

In one embodiment, a method further includes placing a plurality of bridge members adjacent one another on a shelf of the tray to form a bridge assembly of the tray, the bridge assembly defining the support surface, wherein removably installing the absorbent member includes installing the absorbent member in a space between the shelf and the support surface.

In one embodiment, a method further includes mounting another tray on the rack assembly; supporting another battery on a support surface of the another tray; and removably installing another absorbent member on the another tray below the another battery and between the battery and the another battery for containing a spilled substance of the another battery.

According to another embodiment of the present invention, a method of containing a spilled substance of a battery includes supporting the battery on a rack assembly; placing an absorbent member in a recess of a drawer; and removably sliding the drawer between base members of the rack assembly below the battery.

According to another embodiment of the present invention, an absorbing cartridge for containing a spilled substance of a battery includes an absorbent element configured to at least one of absorb and neutralize the spilled substance of the battery; at least one retaining screen adjacent an outer surface of the absorbent element; and a frame member around an outer edge of the absorbent element and a corresponding outer edge of the at least one retaining screen.

Further aspects of embodiments of the present invention provide a battery spill containment system including a liquid detection device or pH sensor coupled to the tray and electrically connected to a relay configured to send an alarm. The described system may be connected to a central alarm system for alerting fire, security, or property owners that a leak has been detected.

Still further aspects of embodiments of the present invention provide a battery spill containment system including trays or modules configured to be added to existing relays racks, cabinets, stacks, or open frames for providing a retrofit capability. Such a retrofit may be more cost effective, occupy less space, and provide improved accessibility for maintenance than typical containment systems for existing battery racks or cabinets. Such a retrofitting process may be desirable when the batteries reach end of life and need replacement. Additionally, old battery trays or modules may be recycled or used in other applications.

Still further aspects of embodiments of the present invention provide a battery spill containment system providing ease of visual inspection of absorbent pads or cartridges during a maintenance process by simply sliding them out with a drawer or directly from a pan beneath the battery tray. The absorbent and/or neutralizing pads may be configured to change color upon absorption of a spill or change in pH.

Other features and advantages of embodiments of the present invention will become apparent from the following detailed description, taken in conjunction with the accompanying drawings which illustrate, by way of example, the features of the present invention.

BRIEF DESCRIPTION OF THE DRAWINGS

FIGS. 2A-2C are schematic perspective views of a battery rack assembly including a battery spill containment system according to an embodiment of the present invention, showing a spill containment drawer inserted, partially withdrawn, and withdrawn, respectively.

FIGS. 3A and 3B are front views of the battery rack assembly including the battery spill containment system of FIG. 1 showing a spill containment drawer open and removed, respectively.

FIG. 4 is a perspective view of the battery spill containment system of FIG. 1 showing an absorbent member in a spill containment drawer.

FIG. 5 is a perspective view of a battery tray of the battery spill containment system of FIG. 1.

DETAILED DESCRIPTION

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive.

With reference to FIGS. 1-3B, according to an embodiment of the present invention, a battery rack assembly 10 includes a battery rack 12, one or more batteries 14, and a battery spill containment system 100. The battery rack assembly 10 may be adapted to provide primary or backup power for wireless applications, railroads, industrial applications, or any other desired power applications.

The battery rack 12 may be any battery rack or cabinet commonly used for storage of industrial or other batteries. For example, the battery rack 12 may be similar to the battery racks disclosed in any of U.S. Pat. Nos. 6,308,728; 6,395,417; 6,901,946; 7,124,771; 7,428,911; and 7,691,526, each to Frazier, the entire content of each of which is incorporated by reference herein.

The batteries 14 may be any batteries for which spill containment is desired. For example, the batteries 14 may be similar to the batteries disclosed in any of U.S. Pat. Nos. 6,308,728; 6,395,417; 6,901,946; 7,124,771; 7,428,911; and 7,691,526, each to Frazier, the entire content of each of which is incorporated by reference herein. The batteries 14 may be gel batteries, sealed batteries, VRLA batteries, or any other suitable industrial or other batteries. Moreover, the spill containment systems described and shown herein are not limited to spill containment and/or neutralization of battery spills, but rather may be utilized to contain and/or neutralize spills from devices other than batteries.

Figure 1:
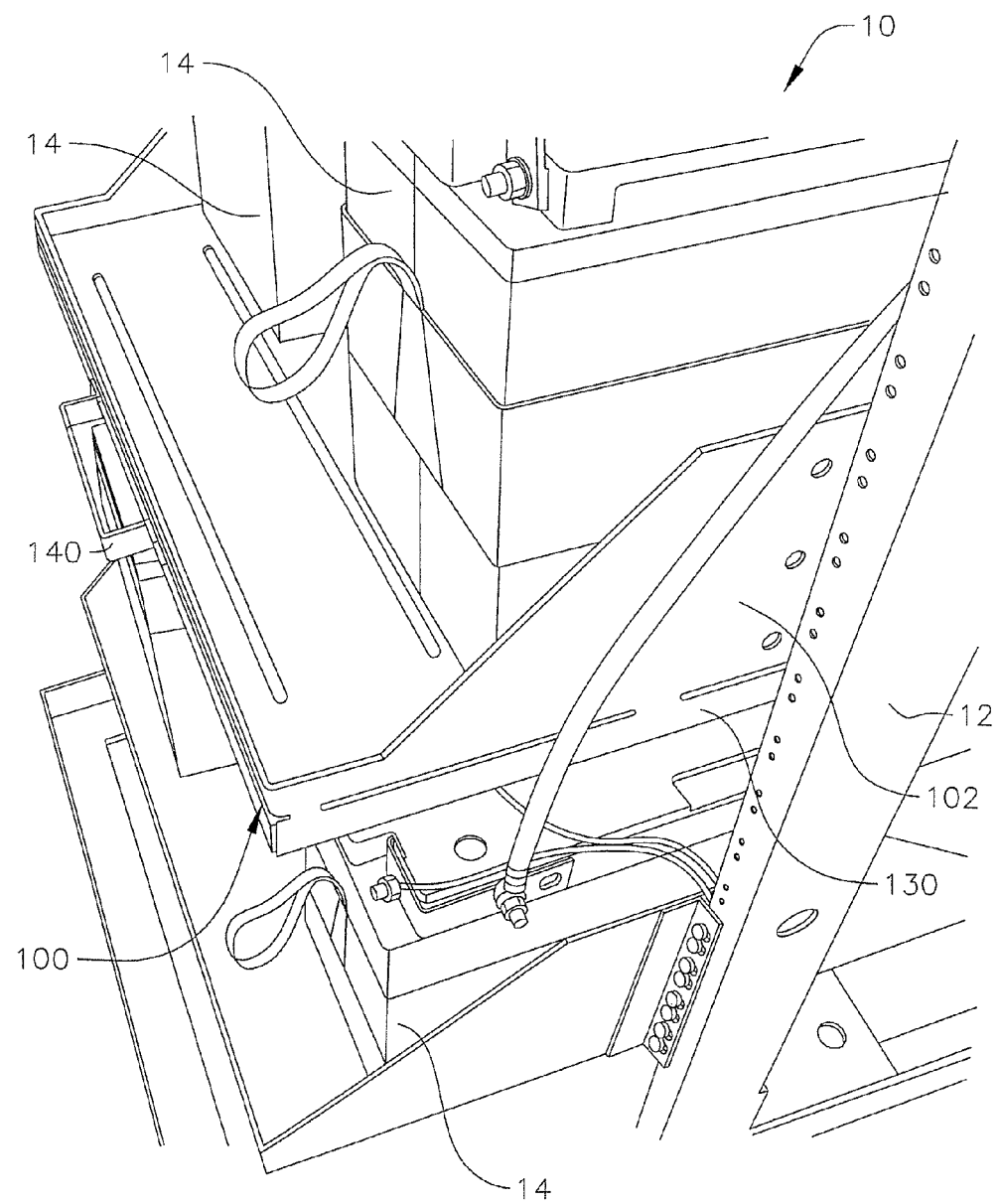
FIG. 1 is a perspective view of a battery rack assembly including a battery spill containment system according to an embodiment of the present invention.
Figure 2D:
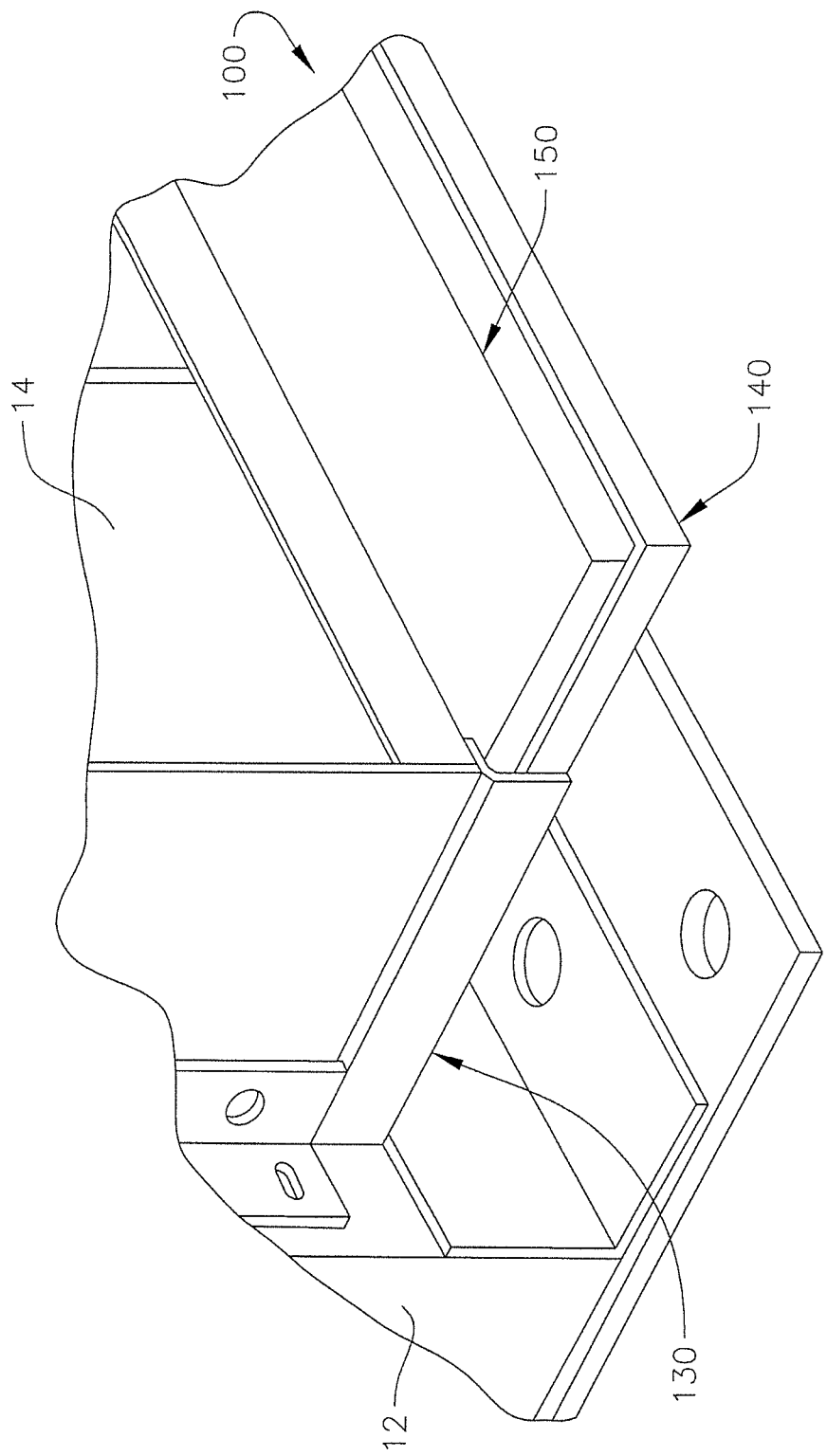
FIG. 2D is a partial detail view of the battery spill containment system of the battery rack assembly of FIG. 2B.
Figure 3B:
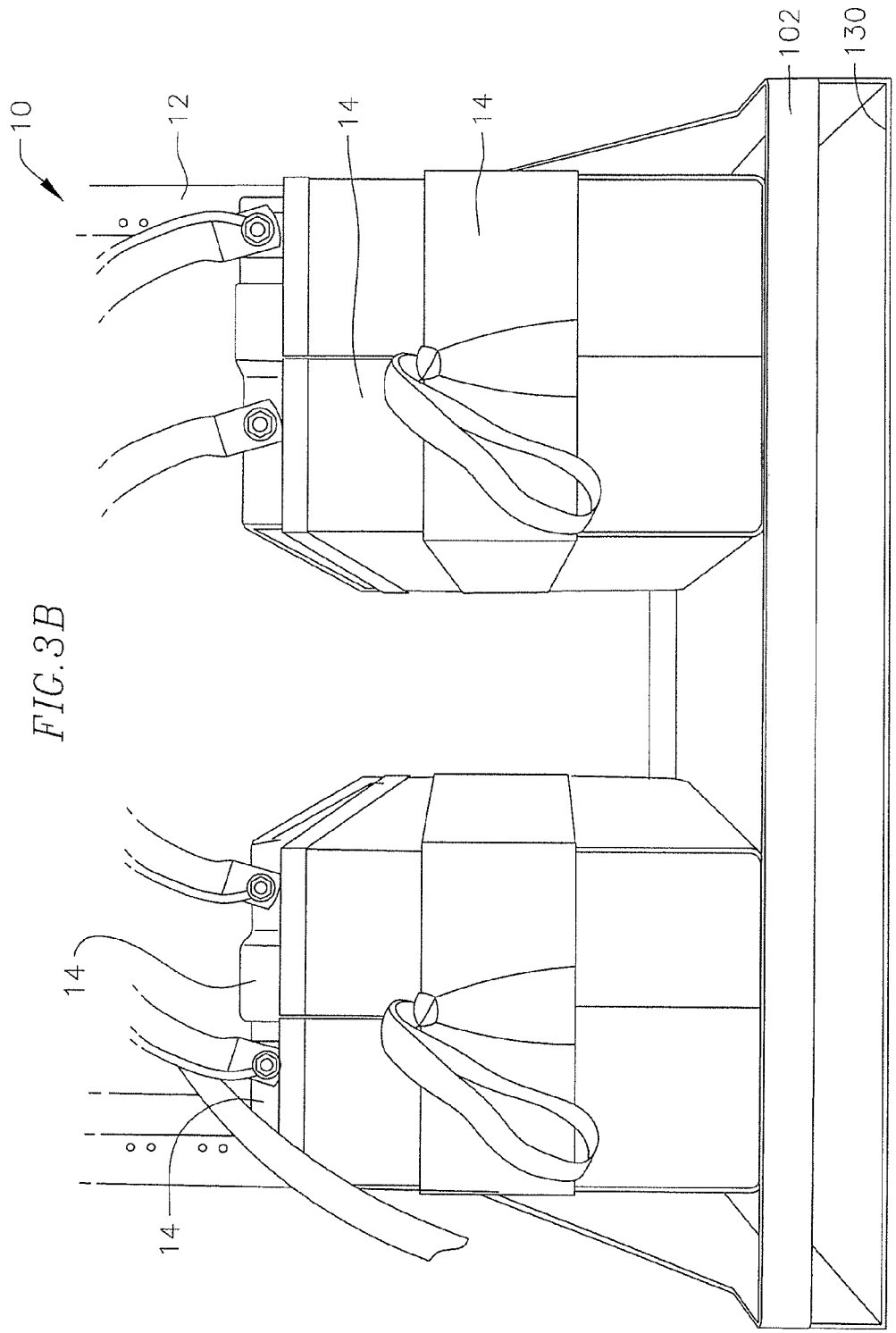

As shown in FIGS. 2A-2C, the battery rack assembly 10 may include the batteries 14 or groups of the batteries 14 mounted above other batteries 14 or groups of batteries 14 on the battery rack 12, and the battery spill containment system 100 may be arranged below one or more of the batteries 14 or groups of batteries 14 (e.g., below each of the batteries 14 or groups of batteries 14, as shown in FIGS. 2A-2D). By way of example, a first battery 14 may be supported on the battery rack 12 with a first battery spill containment system 100 below the first battery 14; a second battery 14 may be supported on the battery rack 12 below the first battery spill containment system 100 with a second battery spill containment system 100 below the second battery 14; and so on with a third battery 14, if desired, and any further desired number of batteries 14 supported one above another. That is, the battery spill containment system 100 may be arranged such that a portion, or unit, of the battery spill containment system 100 under a battery 14 or group of batteries 14 can be replaced without replacing other portion or units. Moreover, in the battery spill containment system shown in FIGS. 2A-2C, portions of the battery spill containment unit 100 can be monitored apart from one another (e.g., via a suitable sensor and/or alarm) such that it can easily be detected from which battery 14 or group of batteries 14 a spill has originated.

The battery spill containment system 100 is configured to support one or more of the batteries 14 of the battery rack assembly 10 and contain, absorb, and/or neutralize spillage from the supported batteries 14, and, in various embodiments, may have any suitable size or shape to perform these functions. Moreover, each of the components of the battery spill containment system 100 described below may be formed of any suitable material and may have a suitable coating for corrosion resistance and/or desired dielectric properties to prevent arcing. In one exemplary embodiment, the components of the battery spill containment system 100 are formed of steel and coated with an ANSI-rated epoxy powder coating. Alternatively, components of the battery spill containment system 100 may be formed of aluminum or any other suitable material.

With reference to FIG. 4, the battery spill containment system 100, according to one exemplary embodiment, includes a tray 102 for supporting one or more of the batteries 14, a pan 130 attached to the bottom of the tray 102, a drawer 140 slidable into and out from the pan 130, and an absorbent pad 150 in the drawer 140 for absorbing and/or neutralizing spillage or leakage from the batteries 14.

Figure 6:
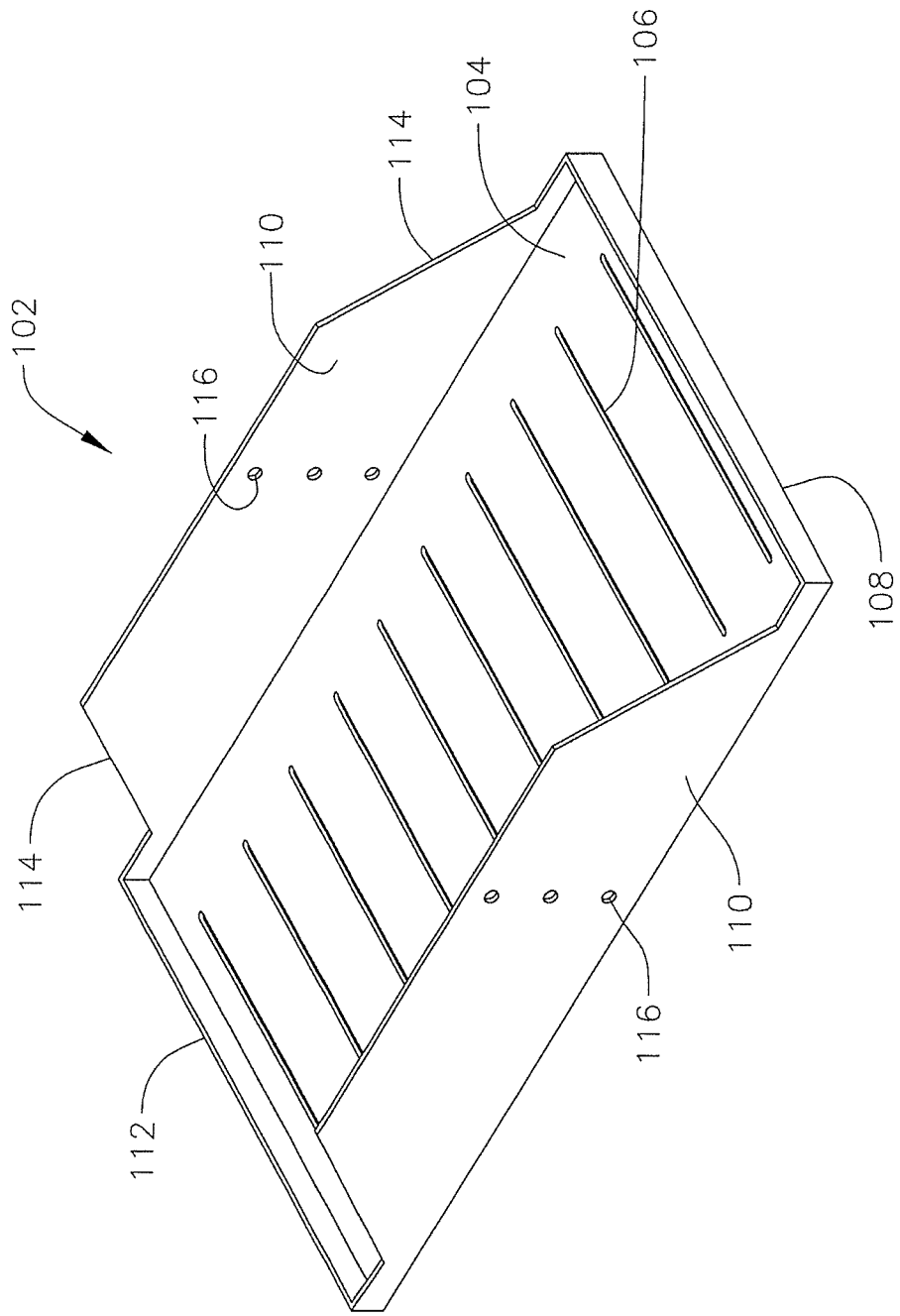
FIG. 6 is a perspective view of the battery tray of FIG. 5 showing brackets for attachment to a battery rack of a battery rack assembly removed.

With reference to FIGS. 5 and 6, the tray 102 is configured to support the batteries 14 and attach the battery spill containment system 100 to the battery rack 12. According to one exemplary embodiment, the tray 102 includes a shelf 104 configured to support one or more of the batteries 14 thereon. The shelf 104, in one exemplary embodiment, has a plurality of slots 106 formed therein for allowing spillage or leakage from the batteries 14 to pass therethrough. Further, the slots 106 may have varying lengths depending on the weight of the batteries 14 and the material and/or thickness of the shelf 104. Alternatively, one or more openings having any suitable shape may be formed to perform the function of the slots 106. Moreover, in one embodiment, additional grooves or gutters may be formed on the top surface of the shelf 104 for draining battery spillage toward the slots 106.

The tray 102, in one exemplary embodiment, further includes a front wall 108, two side walls 110, and a back wall 112. The two side walls 110 extend along opposing sides of the shelf 104 between the front wall 108 and the back wall 112 and are spaced from each other by a distance corresponding to a distance between two support members of the rack 12. Further, in one exemplary embodiment, the side walls 110 may be formed having angled edges 114 (see FIG. 6) for providing ease of installation of the batteries 14 onto the tray 102. The two side walls 110 may further include a pattern of holes 116 for mounting brackets 120 (described later herein) thereto for attachment of the tray 102 to the support members of the rack 12. The tray 102 may be formed from a sheet by stamping or any other suitable process. Further, the front wall 108, the side walls 110, and the back wall 112 may be bent upward from the shelf 104 and welded to one another at the corners. Embodiments of the tray 102 may have any suitable dimensions for carrying out the spirit and scope of the invention as set forth herein.

Figure 7:
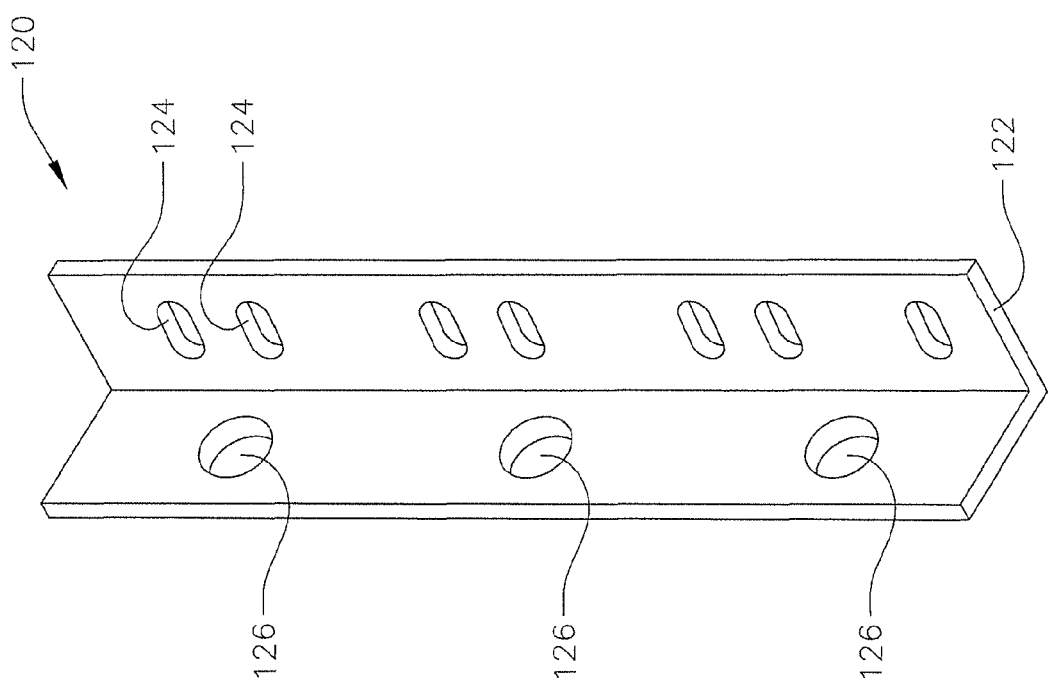
FIG. 7 is a perspective view of a bracket of the battery tray of FIG. 5 for attachment to a battery rack of a battery rack assembly.

With reference to FIG. 7, the brackets 120 are configured to attach the battery spill containment system 100 (via the side walls 110 of the tray 102) to the rack 12. According to one exemplary embodiment, the battery spill containment system 100 includes a bracket 120 and a bracket 120' on each side wall 110 of the tray. In one exemplary embodiment, each of the brackets 120 is formed of a steel structural angle 122 and has a pattern of holes 124 formed on one side of the angle 122 corresponding to holes on the rack 12. The holes 124 receive bolts or other fasteners for attaching the bracket 120 to the rack 12. Further, the brackets 120 include holes 126 formed on the side of the angle 122 opposite the holes 124. The holes 126 correspond to the holes 116 formed in the side walls 110 of the tray 102 and receive bolts or other fasteners for attaching the brackets 120 to the side walls 110 of the tray 102. Alternatively, the brackets 120 may be formed from bars, plates, square tubing, or any other suitable shape besides structural angle. Embodiments of the brackets 120 may have any suitable dimensions for carrying out the spirit and scope of the invention as set forth herein.

The brackets 120' are nearly identical to the brackets 120 except that the brackets 120' do not have the holes 126 formed therein for attachment to the side walls 110 of the tray 102 via bolts or other fasteners. Rather, the brackets 120' are welded to the side walls 110 of the tray. The welded brackets 120' are configured to locate the tray 102 within the rack 12 during installation of the battery spill containment system 100, after which the brackets 120 are fastened to the side walls 110 of the tray 102. Alternative embodiments of the battery spill containment system may include only brackets 120 that are bolted to the side walls 110 of the tray 102, such as for an aluminum tray. Similarly, other alternative embodiments of the battery spill containment system may include only brackets 120' that are welded to the side walls 110 of the tray 102.

Figure 8:
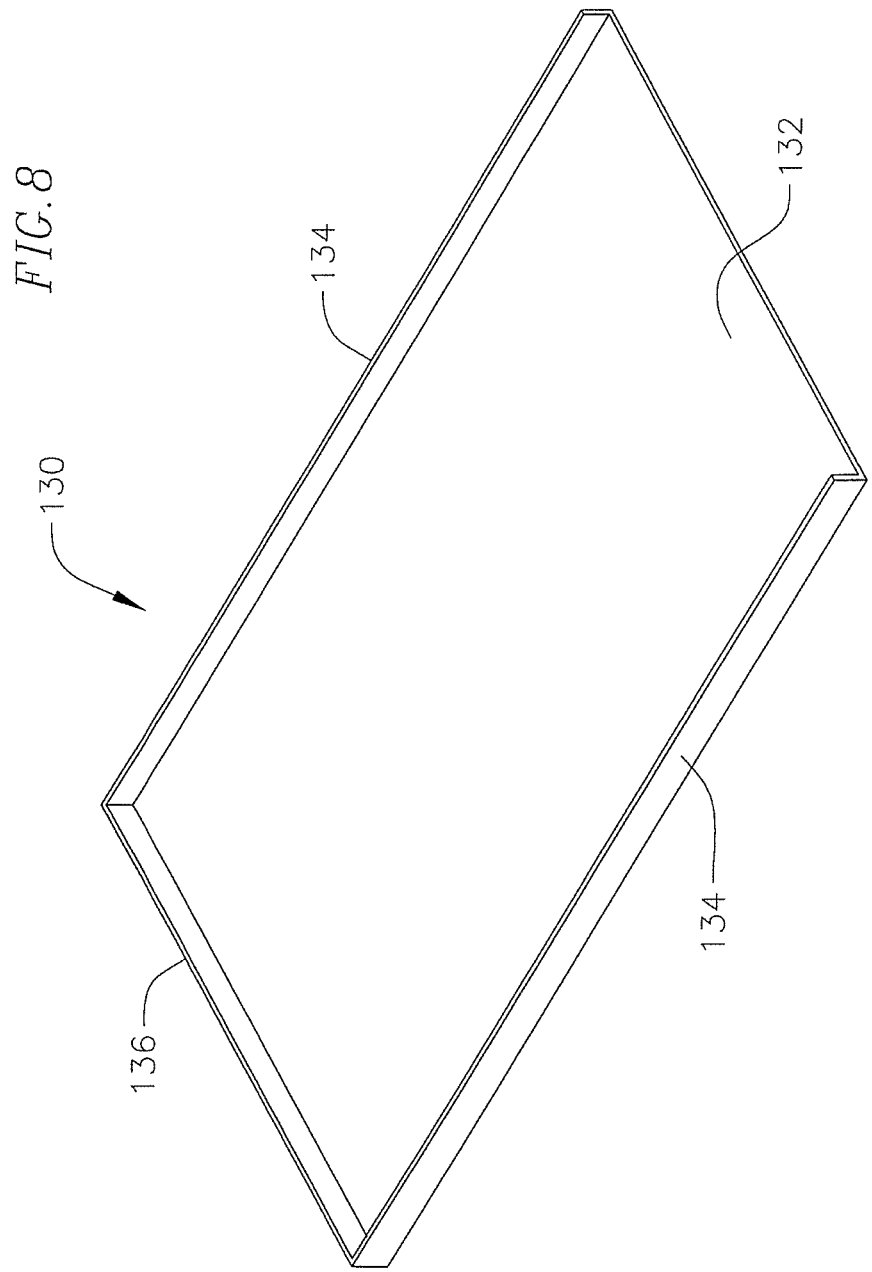
FIG. 8 is a perspective view of a spill containment pan of the battery spill containment system of FIG. 1.

With reference to FIG. 8, the pan 130 includes a shelf portion 132, two opposing side walls 134, and a back wall 136 extending between the two side walls 134. The shelf portion 132 is configured to support the drawer 140. The two side walls 134 extend along opposing sides of the shelf portion 132 from the front to the rear of the shelf portion 132. The two side walls 134, in one exemplary embodiment, have a height slightly greater than a height of the drawer 140 and are spaced from each other by a distance slightly greater than a width of the drawer 140, such that the drawer 140 is slidable in the pan 130 with a relatively close fit. The pan 130 may be formed from a single sheet, and the side walls 134 and the back wall 136 may be bent upward from the shelf portion 132 and welded to one another at the corners. Further, according to one exemplary embodiment, the pan 130 is welded (e.g., via spot-welding) at upper edges of the side walls 134 and the back wall 136 to corresponding outer edges of the shelf 104 of the tray 102 to provide a cavity between the shelf 104 of the tray 102 and the shelf portion 132 of the pan 130 for receiving the drawer 140 therein. In one embodiment, the pan 130 is about 17 inches wide, 30 inches long, and 1 inch deep. However, other embodiments of the pan 130 may have any other suitable dimensions for carrying out the spirit and scope of the invention as set forth herein.

Figure 9:
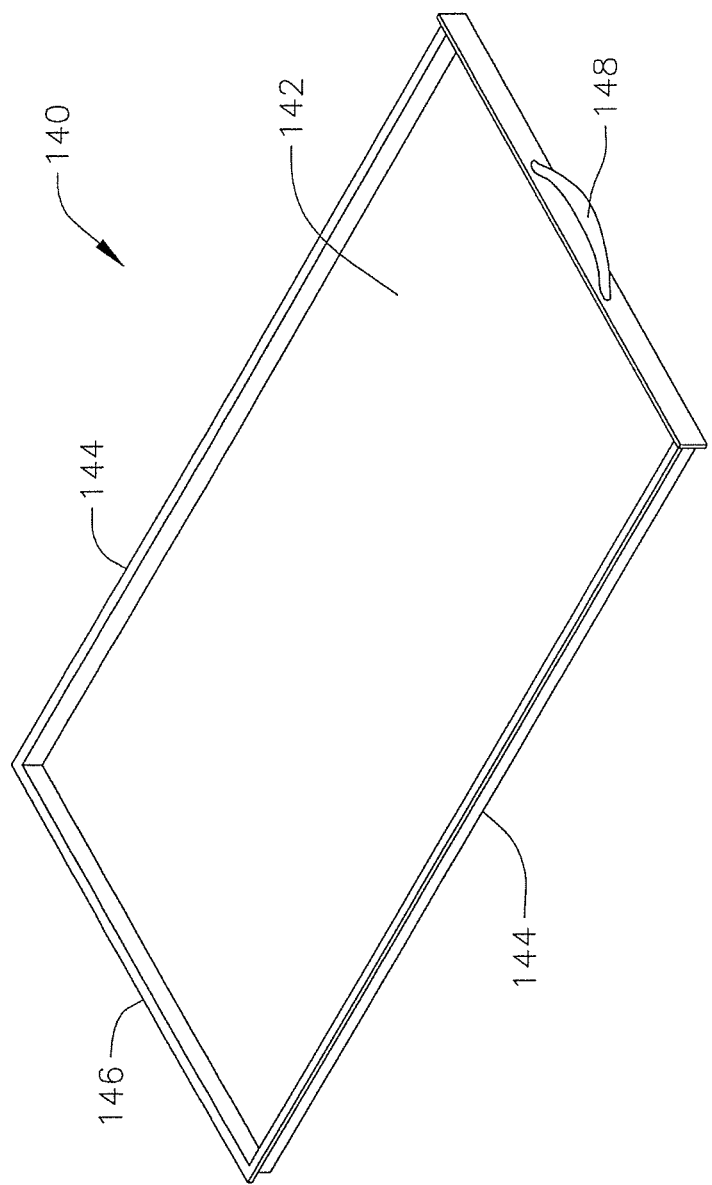
FIG. 9 is a perspective view of a spill containment drawer of the battery spill containment system of FIG. 1.

With reference to FIG. 9, the drawer 140 is configured to contain the absorbent pad 150, as well as leakage from the batteries 14 absorbed by the absorbent pad 150. Similar to the pan 130 described above, the drawer 140, according to one exemplary embodiment, includes a shelf portion 142 for supporting the absorbent pad 150, two opposing side walls 144, and a back wall 146 and a front wall 147 extending between the two side walls 144. The drawer 140 may also include a handle 148 for ease of sliding the drawer 140 into and out from the pan 130. The two side walls 144 extend along opposing sides of the shelf portion 142 from the front to the rear of the shelf portion 142. As described above, the width and height (as well as the length) of the drawer 140, according to one exemplary embodiment, are slightly less than those corresponding dimensions of the pan 130, such that the drawer slides easily into and out of the pan 130 without excessive play. Also similar to the pan 130, the drawer 140 may be formed from a sheet, and the side walls 144, the back wall 146, and the front wall 147 may be bent upward from the shelf portion 142 and welded to one another at the corners. Such welds at the corners of the drawer 140 are made to provide the drawer 140 with a leak-proof configuration. Embodiments of the drawer 140 may have any suitable dimensions for carrying out the spirit and scope of the invention as set forth herein.

Figure 10:
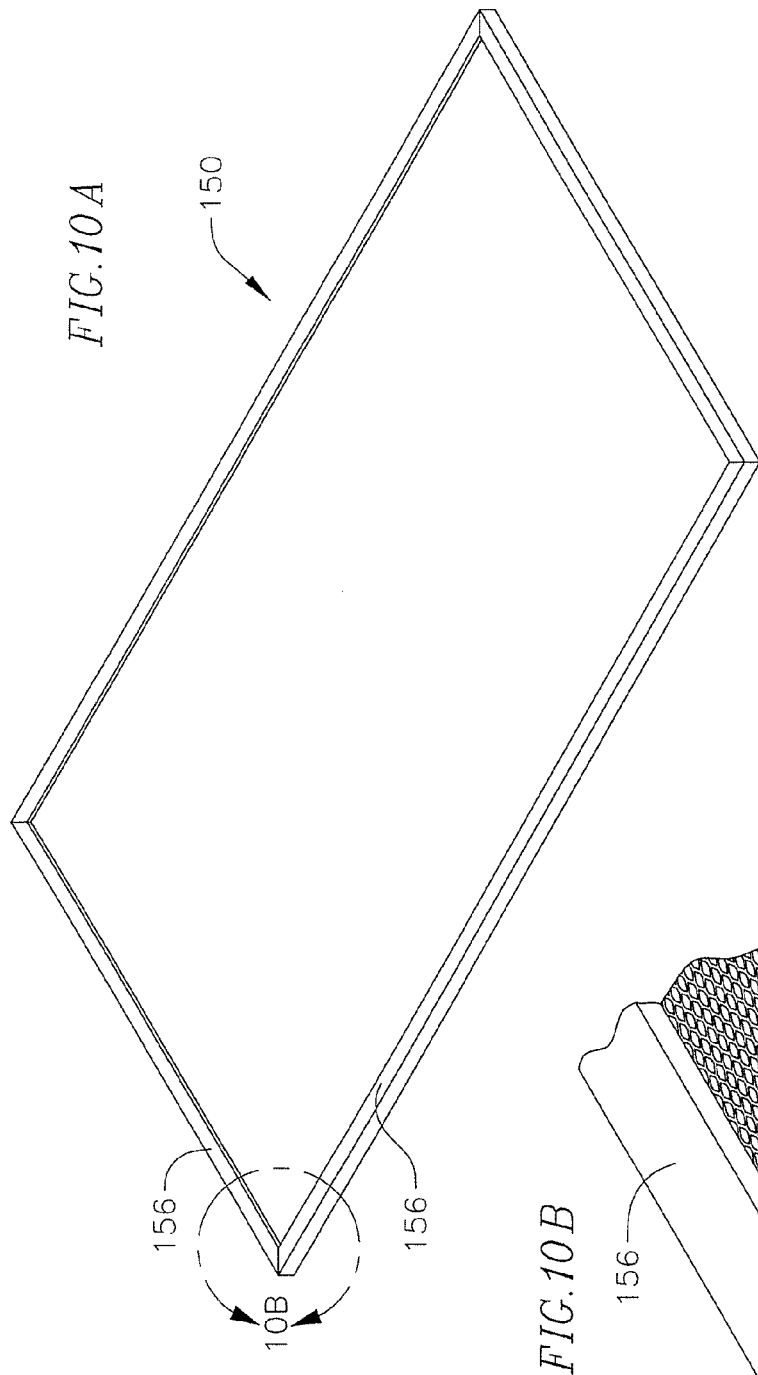
FIG. 10A is a perspective view of an absorbent member of the battery spill containment system of FIG. 1.
FIG. 10B is a detail perspective view of a corner of the absorbent member of FIG. 10A.
Figure 11:
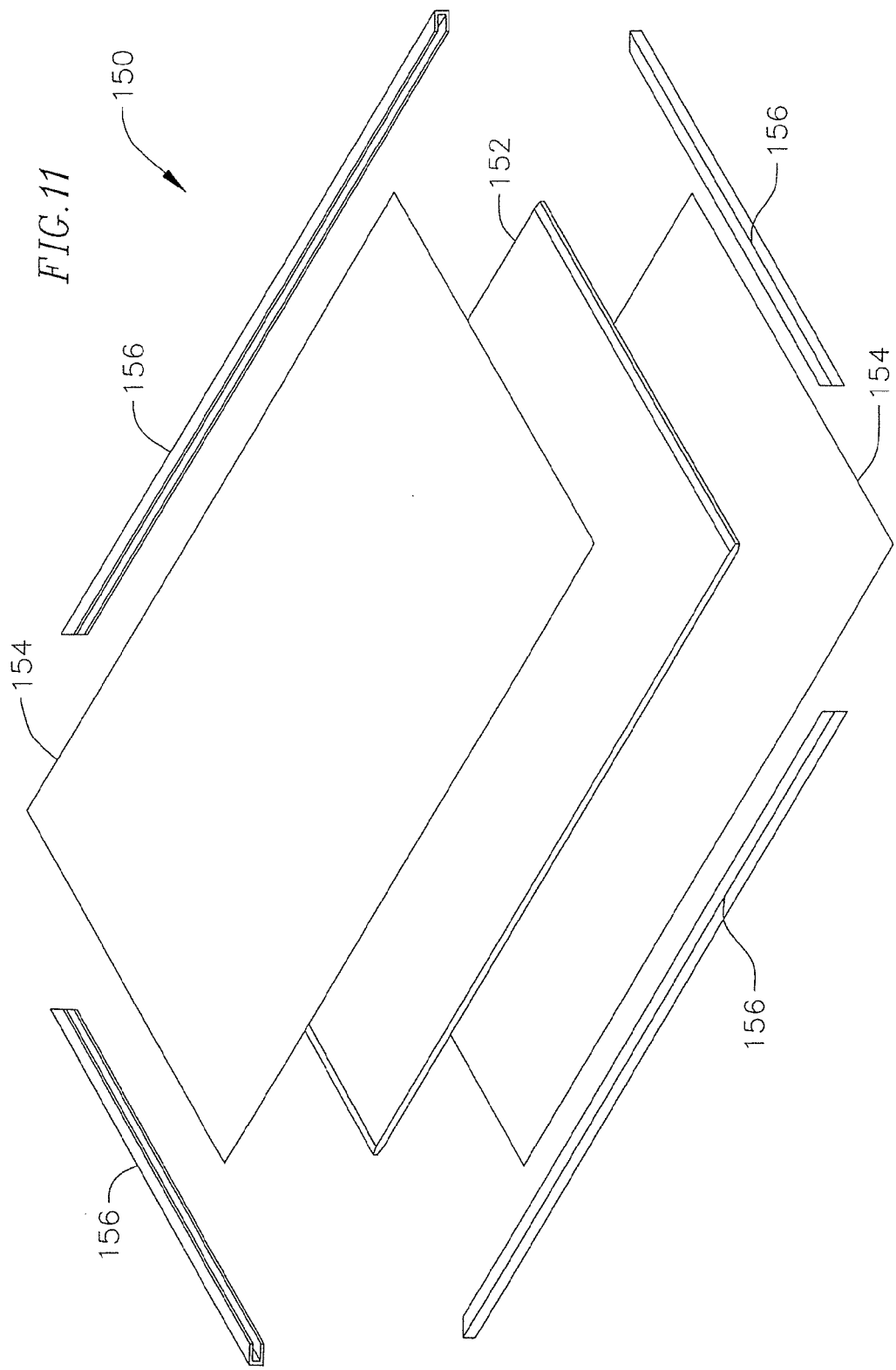
FIG. 11 is an exploded perspective view of the absorbent member of FIG. 10A.

With reference to FIGS. 10A-11, the absorbent pads 150, according to one exemplary embodiment, include an absorbing element 152, retaining screens 154 on each side of the absorbing element 152, and frame members 156 around outer edges of the absorbing element 152 and the retaining screens 154. The absorbing element 152 may include any pad, cartridge, or other device suitable for absorbing spillage from a battery or other device. Additionally, the absorbing element 152 may be neutralizing, that is, configured to neutralize the pH of a spillage. The retaining screens 154 and the frame members 156 are configured to hold the absorbing element 152 in place and provide rigidity to the absorbent pad 150. The absorbent pads 150, according to one exemplary embodiment, are formed of polyvinyl chloride (PVC) and are acid-resistant, flame-retardant, and electrically nonconductive. Alternatively, the absorbent pads 150 may be formed of any other suitable material.

In other embodiments (e.g., embodiments in which the absorbent pads 150 are contained in a drawer such as the drawer 140), the absorbent pads 150 may be made up of the absorbing element 152 without the retaining screens 154 and/or the frame members 156. The absorbent pads 150, for example, may be similar to the spill neutralizing and absorbing pillows disclosed in any of U.S. Pat. Nos. 6,308,728; 6,395,417; 6,901,946; 7,124,771; 7,428,911; and 7,691,526, each to Frazier, the entire content of each of which is incorporated by reference herein. Further, for example, the absorbent pads 150 may be absorbing, non-neutralizing pads sold by EBPS International, 1-inch thick NABPILL absorbing and neutralizing pillows sold by EBPS International, or low-profile, ¼ to ½-inch thick VRLA PAD absorbing and neutralizing pillows sold by EBPS International.

Figure 12:
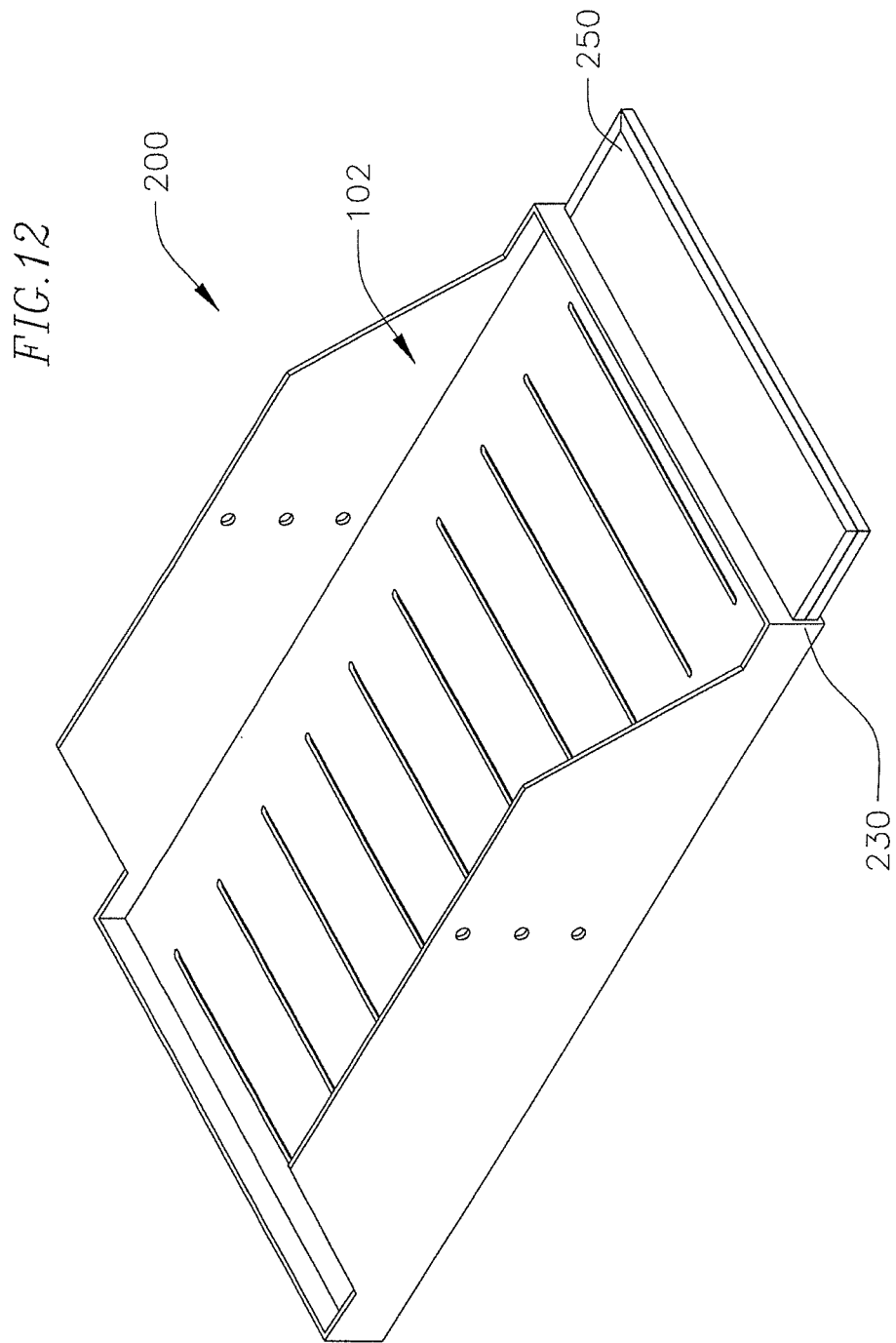
FIG. 12 is a perspective view of a battery spill containment system according to another embodiment of the present invention.
Figure 13:
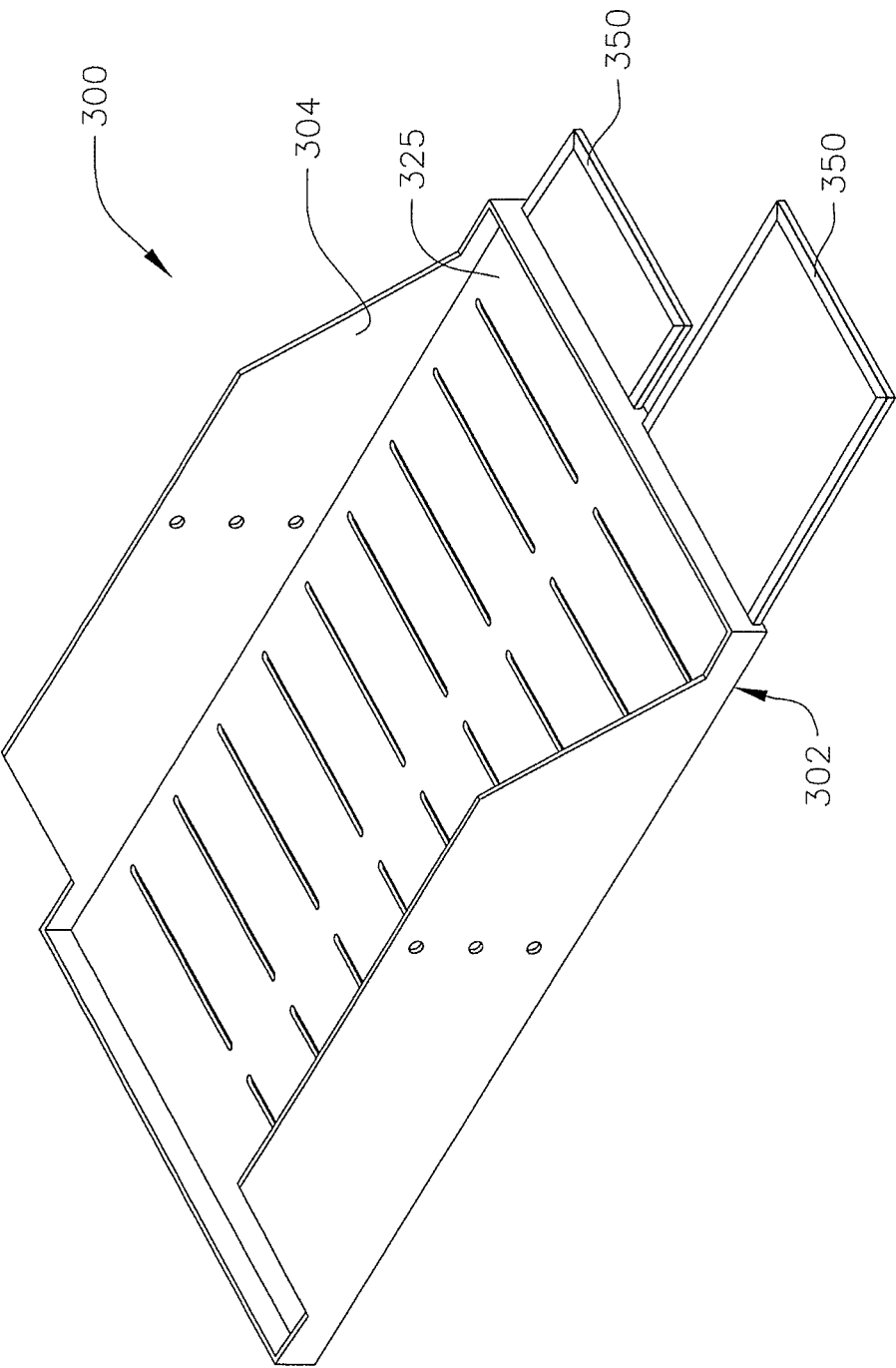
FIG. 13 is a perspective view of a battery spill containment system according to another embodiment of the present invention showing absorbing cartridges partially removed.

With reference to FIG. 12, according to another exemplary embodiment of the present invention, a battery spill containment system 200 is similar to the battery spill containment system 100 described above and, in one embodiment, includes the tray 102 and brackets 120, 120' of the spill containment system 100. However, the battery spill containment system 200 does not include a drawer under the tray. Instead, the battery spill containment system 200 includes a pan 230 configured to receive an absorbent pad, or cartridge, 250 that is directly slidable in and out of the pan 230. That is, unlike the pan 130 of the spill containment system 100 that receives the drawer 140 containing the absorbent pad 150 therein, the pan 230 of the spill containment system 200 receives the absorbent pad 250 directly, without a drawer. As such, the pan 230 may be configured similarly or differently from the pan 130. Likewise, the absorbent pad 250 may be configured similarly to the absorbent pad 150 described above, so long as the absorbent pad 250 is slidable into and out of the pan 230. According to one exemplary embodiment, similar to the battery spill containment system 100 described above, the pan 230 is welded (e.g., via spot-welding) at upper edges of the side walls and the back wall of the pan 230 to corresponding outer edges of the shelf 104 of the tray 102 to provide a cavity between the shelf 104 of the tray 102 and a shelf portion of the pan 230 for receiving the absorbent pad 250 therein.

With reference to FIGS. 13-18, according to still another exemplary embodiment of the present invention, a battery spill containment system 300 includes a battery tray assembly 302 including a battery tray 304 and a battery support bridge 314 made up of a plurality of battery support bridge elements 320. According to one embodiment, the battery spill containment system 300 further includes a drip tray 325 on the battery support bridge 314 adapted to contain spillage from the batteries and direct the spillage onto absorbing cartridges or pads 350 supported directly on the battery tray 304. Unlike the battery spill containment system 100 described above, the battery spill containment system 300 does not include a separate pan attached to a tray for providing a cavity therebetween for housing absorbent members. Rather, the absorbing cartridges 350 of the battery spill containment system 300 rest directly on the battery tray 304, and the batteries are supported and raised above a floor of the battery tray 304 by the battery support bridge 314. As such, the battery spill containment system 300 is adapted to retrofit existing battery trays by adding the battery support bridge 314 on the existing battery tray and inserting the absorbing cartridges 350 within cavities formed by the battery support bridge 314. Moreover, in a retrofit application, a number of battery support bridge elements 320 may be selected to provide the battery support bridge 314 with a length corresponding to a length of the existing battery tray.

Figure 15:
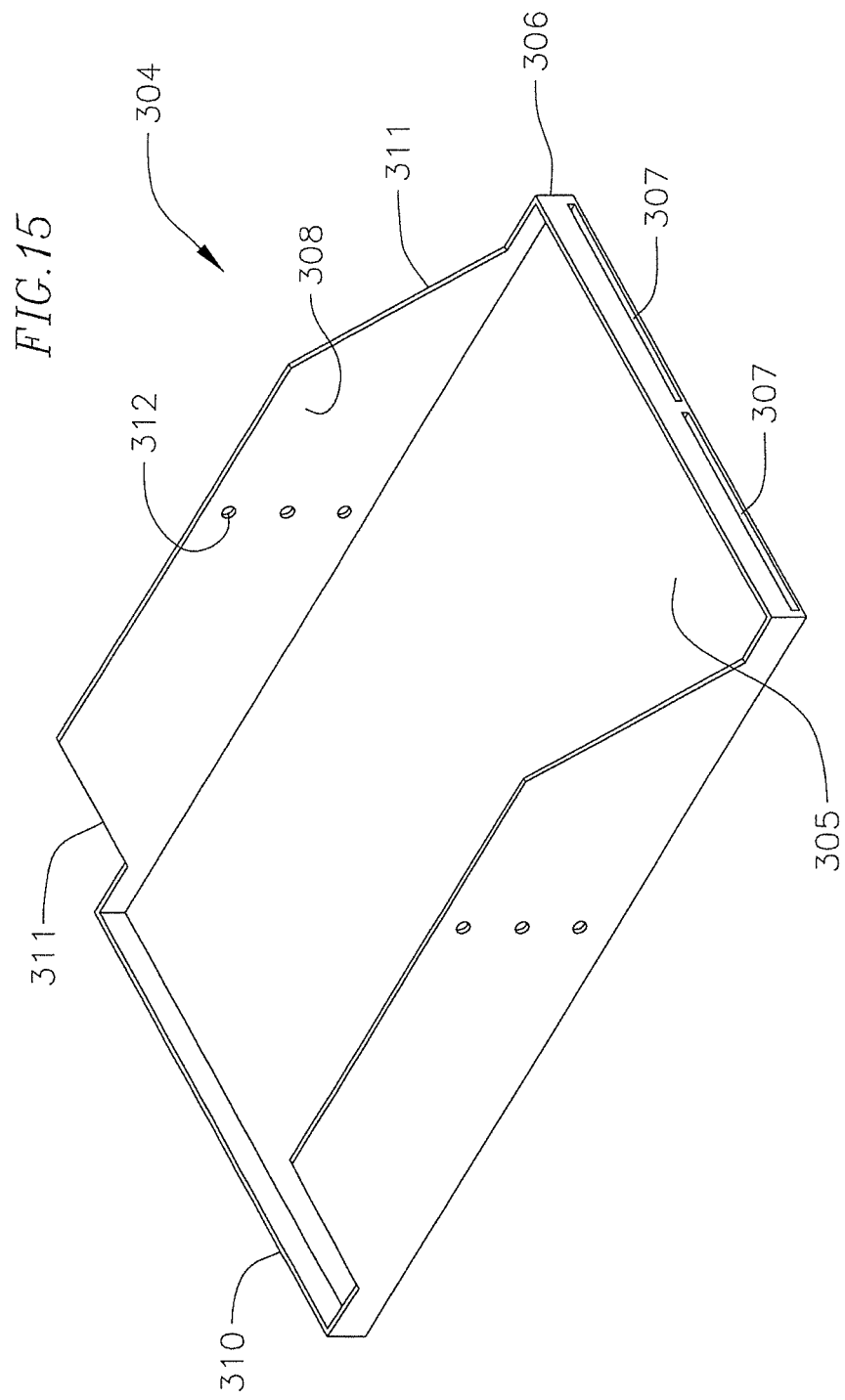
FIG. 15 is a perspective view of a battery tray of the battery spill containment system of FIG. 13.

With further reference to FIG. 15, the battery tray 304, in one exemplary embodiment, is similar to the tray 102 of the battery spill containment system 100 described above. The battery tray 304 includes a shelf 305 for supporting the absorbing cartridges 350, a front wall 306 having openings 307 formed therein for receiving the absorbing cartridges 350, two side walls 308, and a back wall 310. The shelf 305 does not require any slots or other apertures as provided in the tray 102 described above because the absorbing cartridges 350 rest directly on the shelf 305 (although, in an alternative embodiment, the absorbing cartridges 350, or any other suitable absorbent member, may be supported in a drawer similar to the drawer 140 described above and the drawer may be slidably inserted into the opening 307 and supported on the shelf 305). Further, the side walls 308 may include angled edges 311 and holes 312 similar in form and function to the angled edges 114 and holes 116 of the tray 102 described above. The battery tray 304 may be formed by stamping or any other suitable process, and the front wall 306, side walls 308, and back wall 310 may be folded upward and welded to one another at the corners. The battery tray 304 may further include a small lip (not shown) at the front edge of the cartridge slots for retention of the absorbing cartridges 350 (e.g., during an earthquake).

Figure 16:
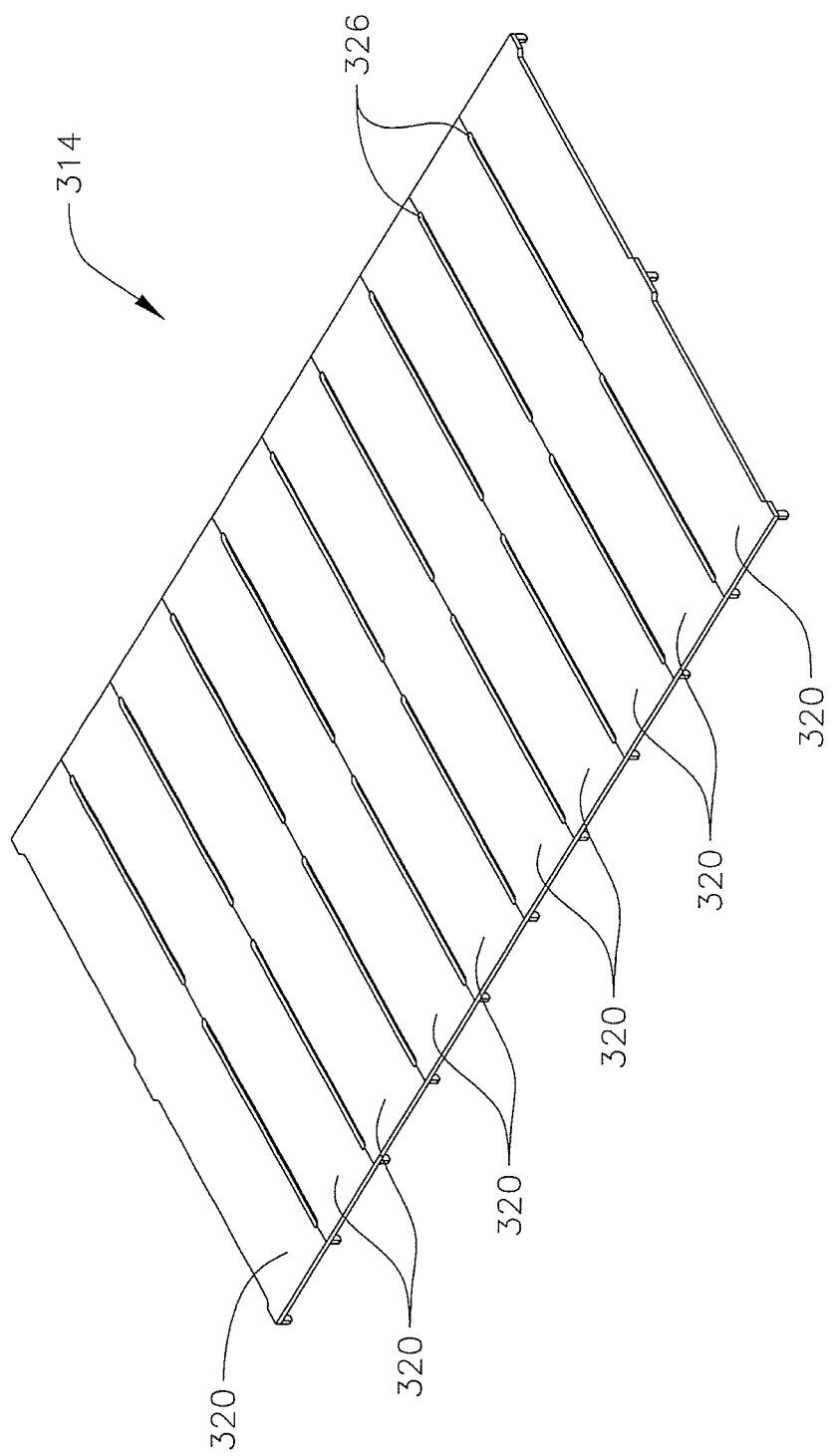
FIG. 16 is a perspective view of a battery support bridge of the battery spill containment system of FIG. 13.
Figure 17:
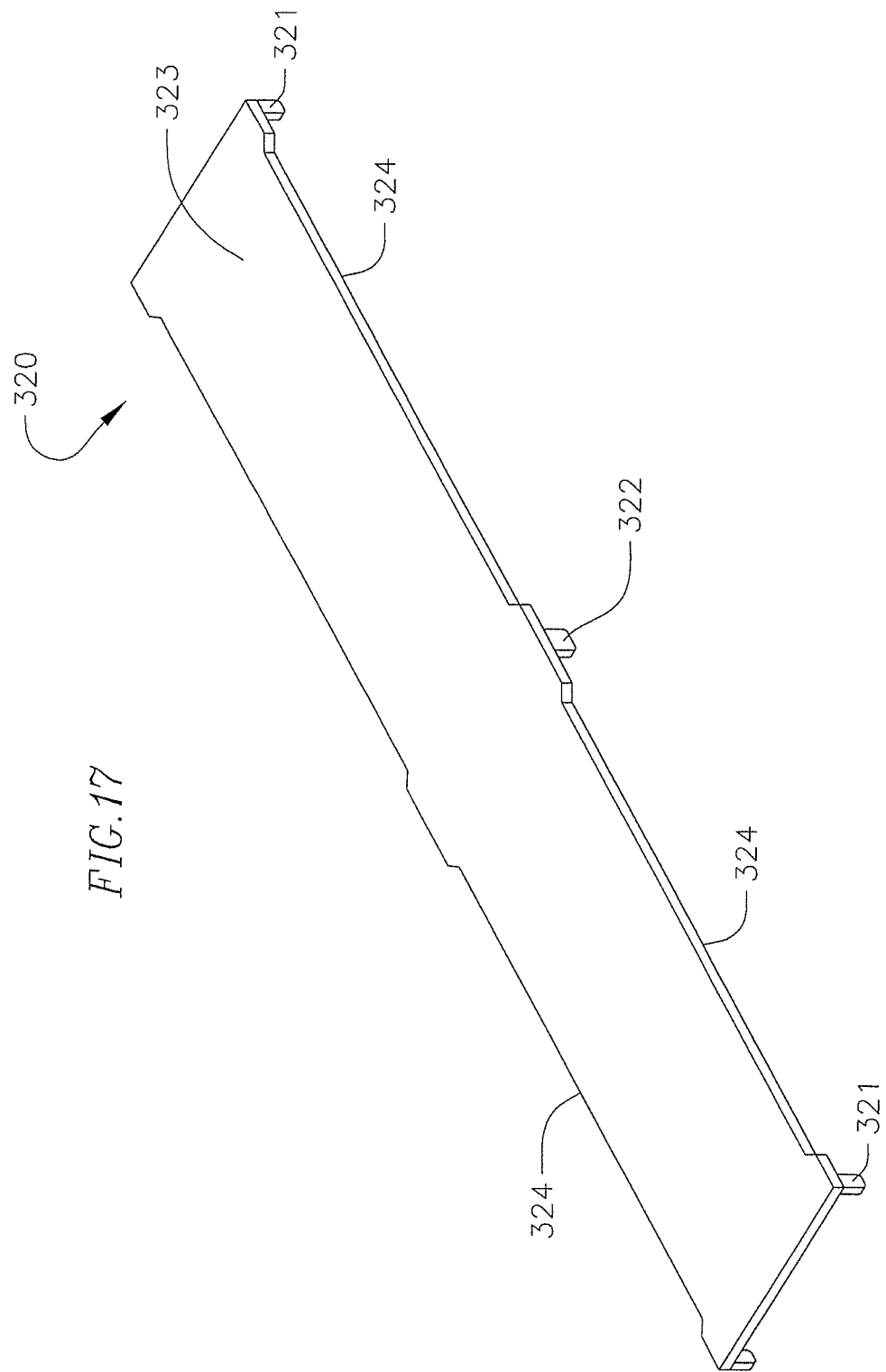
FIG. 17 is a perspective view of a battery support bridge element of the battery support bridge of FIG. 16.

With further reference to FIG. 16, the battery support bridge 314 is made up of the battery support bridge elements 320 arranged side by side on the shelf 305 of the battery tray 304. With further reference to FIG. 17, each of the battery support bridge elements 320, or slats, according to one exemplary embodiment, includes a battery support surface 323 for supporting the batteries thereon, and outer support ribs 321 and a center support rib 322 adapted to rest on the shelf 305 of the battery tray 304 and raise the batteries above the shelf 305. Cavities are formed between the center support rib 322 and each of the respective outer support ribs 321 for receiving the absorbing cartridges 350 therein. As shown in FIG. 17, the battery support surface 323 may include recessed portions 324 configured such that when the battery support bridge elements 320 are arranged side by side, openings 326 are formed (see FIG. 16) for allowing battery spillage to drain therethrough, similar to the slots 106 of the tray 102 of the battery containment system 100.

Figure 14:
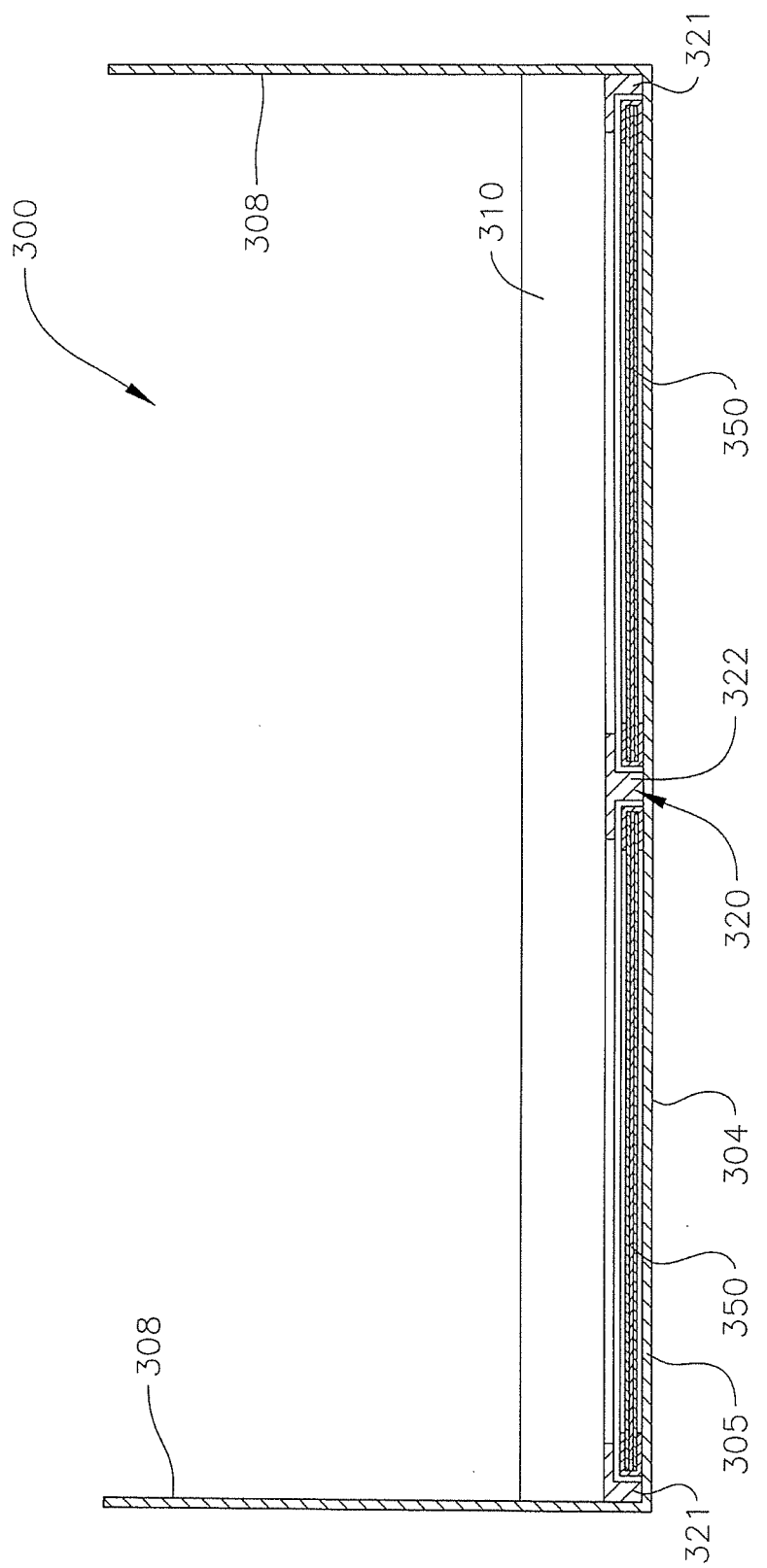
FIG. 14 is a sectional view of the battery spill containment system of FIG. 13.
Figure 18:
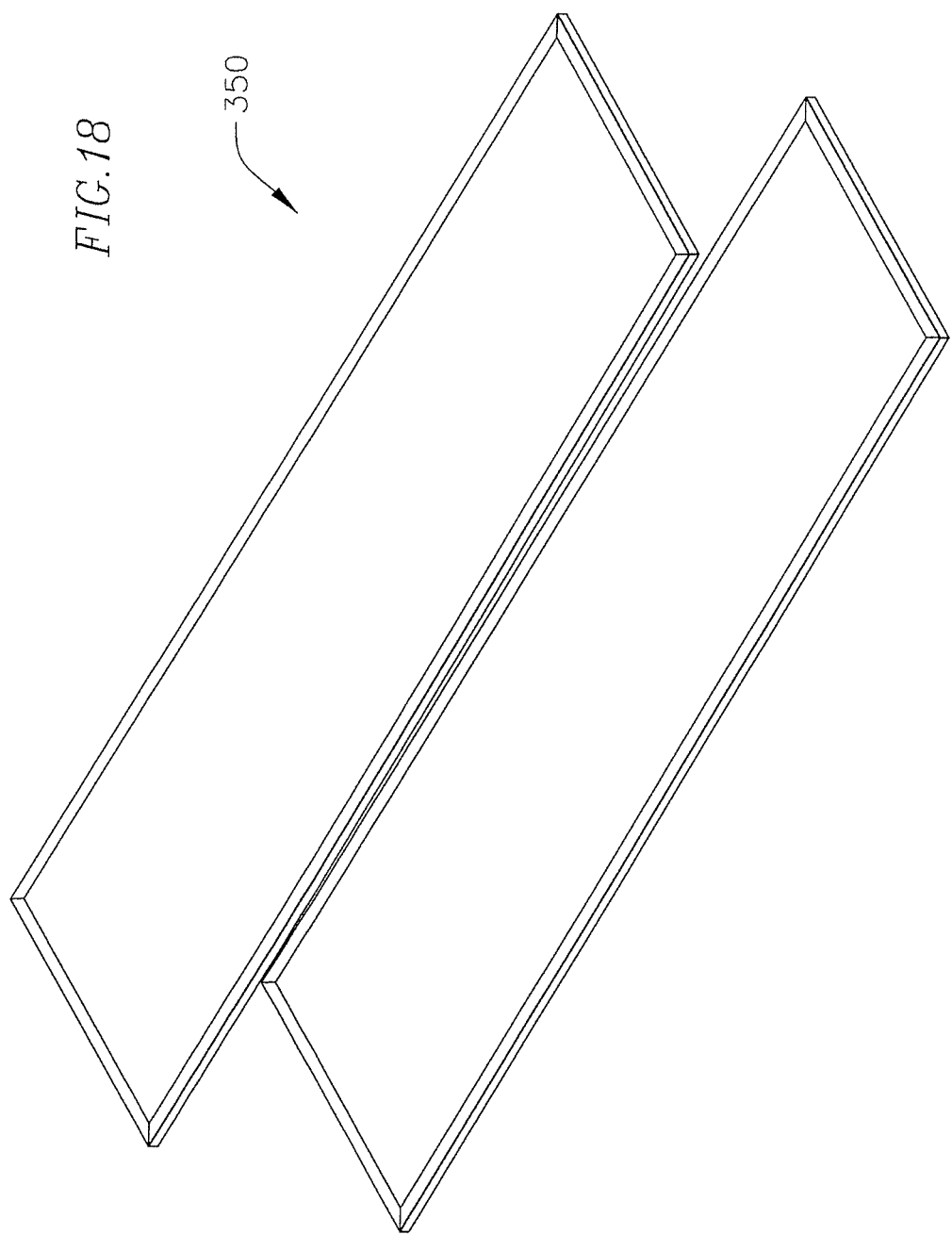
FIG. 18 is a perspective view of the absorbing cartridges of the battery spill containment system of FIG. 13.

With further reference to FIG. 18, the absorbing cartridges 350, in one exemplary embodiment, are configured similarly to the absorbent pads 150 of the spill containment system 100 described above, but the spill containment system 300 includes two absorbing cartridges 350 located side by side on the battery 312 and separated by the center support rib 322 (see FIG. 14).

Figure 19:
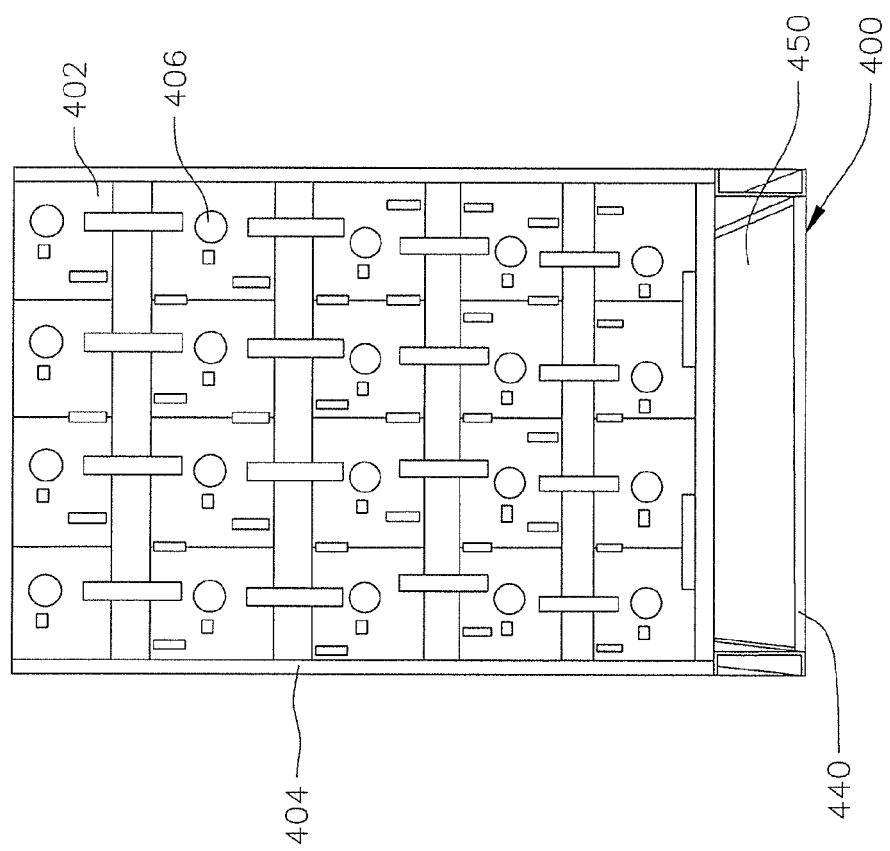
FIG. 19 is a front perspective view of a battery spill containment system according to another embodiment of the present invention.
Figure 20:
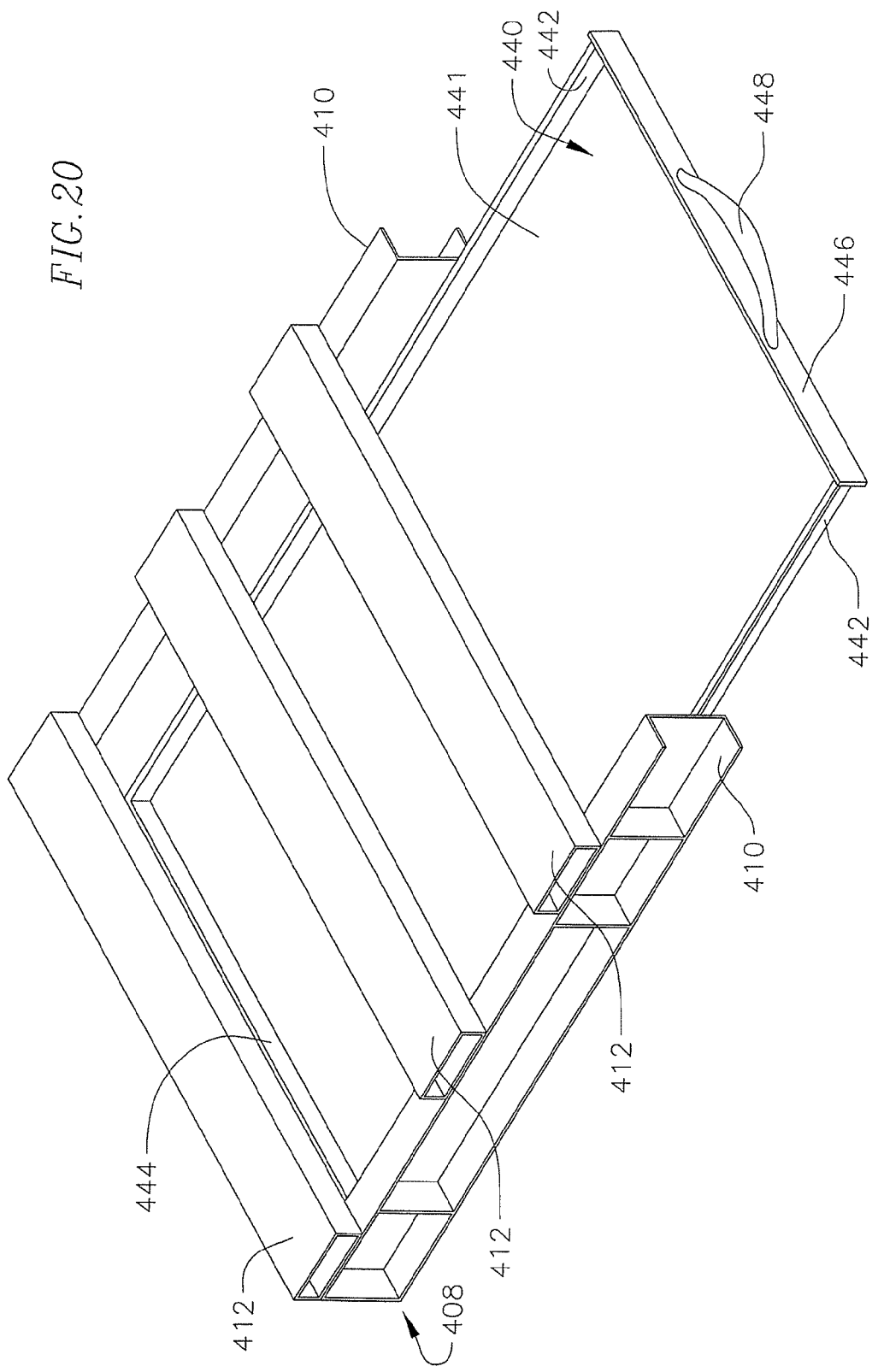
FIG. 20 is a perspective view of a spill containment drawer of the battery spill containment system of FIG. 19 shown partially removed from a base of a battery stack.

With reference to FIGS. 19 and 20, according to yet another exemplary embodiment of the present invention, a battery spill containment system 400 is configured to provide battery spill containment for a battery stack 402 including a battery stack support 404 supporting one or more batteries 406. The batteries 406 of the battery stack 402 may be similar to the batteries 14 of the battery rack assembly 10 described above. In one embodiment, the batteries 406 may have a long usable life, such as 20-year batteries, or in another embodiment, the battery stack 402 as a whole may provide a long usable life (e.g., 20 years or more), such as by incorporating a greater number of batteries 406. The battery stack 402 may be adapted to provide primary or backup power for wireless applications, railroads, industrial applications, or any other desired power applications. Further, the battery stack 402 may be a new installation having the battery spill containment system 400 installed under the battery stack 402 for containing and/or neutralizing leakage or spillage from one or more of the batteries 406 of the battery stack 402, or alternatively, the battery stack 402 may have been previously installed and/or operated, and the battery spill containment system 400 is added under the battery stack 402 (i.e. a retrofit).

The battery stack support 404 supports the batteries 406 above the floor or ground, such as in an array pattern, as shown in FIG. 19. The battery stack support 404 may have any suitable configuration for supporting the batteries 406, such as including structural channels, bars, plates, and/or other structural members, and may include any suitable corrosion-resistant coating. A base 408 of the battery stack support 404 (see FIG. 20) provides a space between the batteries 406 and the floor or ground on which the battery spill containment system 400 is installed. In one exemplary embodiment, as shown in FIG. 20, the base 408 of the battery stack support 404 may be formed from structural members (e.g., structural channels, tubes, or bars) including side rails 410 spaced apart from each other by a distance and cross supports 412 spanning and supported by the side rails 410.

The battery spill containment system 400, according to one exemplary embodiment, includes a battery spill containment drawer 440 and one or more absorbent pads 450 in the drawer 440. The drawer 440, in one exemplary embodiment, is substantially similar to the drawer 140 described above with respect to the battery spill containment system 100. As such, the battery spill containment drawer 440 is configured to contain the absorbent pad 450, as well as leakage from the batteries 406 absorbed by the absorbent pad 450. In one exemplary embodiment, the drawer 440, includes a shelf portion 441 for supporting the absorbent pad 450, two opposing side walls 442, and a back wall 444 and a front wall 446 extending between the two side walls 442. The drawer 440 may also include a handle 448 for ease of removing the drawer 440 from underneath the battery stack 402. The two side walls 442 extend along opposing sides of the shelf portion 441 from the front to the rear of the shelf portion 441. The drawer 440, in one exemplary embodiment, is formed from a sheet of steel and coated with an ANSI-rated epoxy powder coating, but alternatively may be made of a different metal, a plastic, or any other suitable material and may have any suitable coating for corrosion resistance. Further, in one exemplary embodiment, the side walls 442, the back wall 444, and the front wall 446 may be bent upward from the shelf portion 441 and welded to one another at the corners to provide the drawer 440 with a leak-proof configuration. The dimensions of the drawer 440 are such that the drawer 440 fits under the battery stack 402 between the side rails 410 of the battery stack support 404. That is, a width of the drawer 440 is less than the spacing distance between the side rails 410, and in one embodiment, is only slightly less to reduce or substantially prevent lateral movement of the drawer 440.

The absorbent pad 450 may be configured to absorb and/or neutralize spillage from the batteries 406 and may be similar or substantially the same as the absorbent pad 150 described above with respect to the battery spill containment system 100. As such, the absorbent pad 450 may include an absorbing element, retaining screens, and frame members similar or substantially the same as the respective absorbing element 152, the retaining screens 154, and the frame members 156 of the absorbent pad 150, or alternatively, as discussed above with respect to the absorbent pad 150, the absorbent pad 450 may include an absorbing element without retaining screens or frame members.

According to another embodiment, one or more of the absorbent pads 450 may be installed under the battery stack 402 without the battery spill containment drawer 440. That is, in such an embodiment, the absorbent pad 450 is placed directly on the floor or ground in the space between the side rails 410 for absorbing and/or neutralizing spillage from the batteries 406.

Additional embodiments of a battery spill containment system according to the present invention include moisture detection or pH sensors 160 (see FIG. 2C), controls, and/or alarm systems 170 (see FIG. 2C), coupleable to the drawer or the absorbing pad, for example, for monitoring and/reporting battery spillage or leakage. Moreover, as a result of the modularity and localization of spill containment of embodiments of the present invention, such monitoring devices are adapted to monitor and report a more specific location of spillage. That is, a monitoring system of an embodiment of the present invention may be adapted to narrow a source of spillage to a certain battery or small group of batteries allowing for quicker and less costly replacement and maintenance.

Although the drawings and accompanying description illustrate certain embodiments of a battery spill containment system, it will be apparent that the novel aspects of the battery spill containment system of the present invention may also be carried out by utilizing alternative structures, sizes, shapes, and/or materials in other embodiments of the battery spill containment system of the present invention. Embodiments of the battery spill containment system may also be adapted for use by various market sectors. For example, as described earlier herein, embodiments of the battery spill containment system may be adapted and utilized for spill containment and/or neutralization of spills from devices other than batteries, such as air conditioning units or water heaters.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. A spill containment system comprising:
   a tray mountable on a rack and comprising a support surface for supporting a device thereon;
   an absorbent member removably installed on the tray below the support surface and configured to absorb a spilled substance of the device; and
   a bridge configured to support the battery above a base portion of the tray, said bridge comprising a plurality of bridge members defining a plurality of openings between adjacent bridge members for allowing the spilled substance to pass therethrough onto the absorbent member, wherein a first edge of one of said openings is defined on a first of said bridge members and second edge of said one of said openings is defined on a second of said bridge members adjacent to the first bridge member, wherein said first bridge member comprises a first edge portion and wherein said second bridge member comprises a second edge portion, wherein said first edge portion is adjacent said second edge portion, and wherein a distance between said first and second edges is greater than a distance between first and second edge portions.

2. The spill containment system of claim 1, wherein the support surface has at least one opening for allowing the spilled substance to pass therethrough onto the absorbent member.

3. The spill containment system of claim 1, wherein the tray comprises a pan below the support surface having a cavity configured to receive the absorbent member therein.

4. The spill containment system of claim 3, wherein the tray further comprises a drawer removably slidable into the cavity of the pan and having a recess for receiving the absorbent member therein.

5. The spill containment system of claim 1, further comprising:
   another tray mountable on the rack and comprising a support surface for supporting another device thereon; and
   another absorbent member removably installed on the another tray below the support surface of the another tray and configured to absorb a spilled substance of the another device.

6. The spill containment system of claim 1, wherein the absorbent member is configured to neutralize the spilled substance.

7. The spill containment system of claim 1, wherein the device comprises a battery.

8. The spill containment system of claim 1, wherein the absorbent member is removably slidable into a cavity formed between the support surface and the base portion.

9. The spill containment system of claim 1, further comprising a sensor adapted to detect a variation of at least one of moisture and pH in the absorbent member.

10. The spill containment system of claim 9, further comprising an alarm connected to the sensor and adapted to report the variation of the at least one of moisture and pH.

11. A battery rack assembly comprising:
   a rack;
   a plurality of batteries supported on the rack one over the other;
   a plurality of trays mounted on the rack one over the other, each of the trays comprising a support surface supporting a battery of the plurality of batteries thereon; and
   at least one absorbent member removably installed in the battery rack assembly below at least one battery of the plurality of batteries and configured to contain a spilled substance of the at least one battery,
   wherein each of the trays has an absorbent member of the at least one absorbent member removably installed thereon below the battery for containing a spilled substance of the battery.

12. The battery rack assembly of claim 11, further comprising a plurality of sensors, each adapted to detect a variation of at least one of moisture and pH in the absorbent member installed on a respective one of the trays.

13. A method of containing a spilled substance of at least a battery of a plurality of batteries, the method comprising:
   mounting a first tray on a rack assembly;
   supporting a first battery of said batteries on a support surface of the first tray;
   removably installing a first absorbent member on the first tray below the first battery;
   mounting a second tray on the rack assembly, above the first tray;
   supporting a second battery of said batteries on a support surface of the second tray; and
   removably installing a second absorbent member on the second tray below the second battery and between the first and second batteries for containing a spilled substance of the battery.

14. The method of claim 13, further comprising placing a plurality of bridge members adjacent one another on a shelf of the first tray to form a bridge assembly of the tray, the bridge assembly defining the support surface of the first tray, wherein removably installing the first absorbent member comprises installing the first absorbent member in a space [between the shelf and] the first tray support surface.

15. The spill containment system of claim 1, wherein said absorbent member is a cartridge.

16. The battery rack assembly of claim 11, further comprising a plurality of drawers slideable in said plurality of trays, wherein each of said absorbent members is housed within each of said drawers.

17. The battery rack assembly of claim 11, wherein each tray comprises another surface spaced apart from said supporting surface defining a space there-between, wherein said tray absorbent member is in said space.

18. The battery rack assembly as recited in claim 11, wherein said absorbent member is a cartridge.

19. The method of claim 13, wherein removably installing a first absorbent material comprises installing a first cartridge.

20. The method of claim 13, wherein the support surface of said first and second trays each comprise at least an opening for drainage of said spilled substance.

21. A spill containment system comprising: a first tray mountable on a rack and comprising a support surface for supporting a device thereon, wherein the tray comprises a bridge assembly configured to support the device above a base portion of the tray, the bridge assembly defining the support surface; and an absorbent member removably installed on the first tray below the support surface and configured to absorb a spilled substance of the device, wherein the first tray comprises a pan below the support surface having a cavity configured to receive the absorbent member therein.

22. The spill containment system of claim 21, wherein the support surface has at least one opening for allowing the spilled substance to pass therethrough onto the absorbent member.

23. The spill containment system of claim 21, wherein the first tray further comprises a drawer removably slidable into the cavity of the pan and having a recess for receiving the absorbent member therein.

24. The spill containment system of claim 21, further comprising:
   a second tray mountable on the rack above the first tray and comprising a support surface for supporting another device thereon; and
   another absorbent member removably installed on the second tray below the support surface of the second tray and configured to absorb a spilled substance of the another device.

25. The spill containment system of claim 21, wherein the absorbent member is configured to neutralize the spilled substance.

26. The spill containment system of claim 21, wherein the device comprises a battery.

27. The spill containment system of claim 21, wherein the bridge assembly comprises a plurality of bridge members arranged adjacent one another on the base portion.

28. The spill containment system of claim 21, wherein the bridge assembly has at least one opening for allowing the spilled substance to pass therethrough onto the absorbent member.

29. The spill containment system of claim 21, wherein the absorbent member is removably slidable into a cavity formed between the support surface and the base portion.

30. The spill containment system of claim 21, further comprising a sensor adapted to detect a variation of at least one of moisture and pH in the absorbent member.

31. The spill containment system of claim 21, further comprising an alarm connected to the sensor and adapted to report the variation of the at least one of moisture and pH.

32. The spill containment system of claim 21, wherein said absorbent member is a cartridge.

* * * * *